US006548162B1

(12) United States Patent
Machida et al.

(10) Patent No.: US 6,548,162 B1
(45) Date of Patent: Apr. 15, 2003

(54) SANITARY WARE AND PROCESS FOR PRODUCING THE SAME

(75) Inventors: Mitsuyoshi Machida, Kitakyushu (JP); Koichi Hayashi, Kitakyushu (JP); Hirotaka Ishibashi, Kitakyushu (JP); Tomoyasu Ichiki, Kitakyushu (JP); Masaaki Ito, Kitakyushu (JP); Masami Ando, Kitakyushu (JP); Atsushi Kitamura, Kitakyushu (JP); Toshihiro Aoshima, Kitakyushu (JP); Katsuhiro Kawakami, Kitakyushu (JP); Satoshi Horiuchi, Kitakyushu (JP); Makoto Hayakawa, Kitakyushu (JP)

(73) Assignee: Toto Ltd., Fukuoka Ken (JP)

( * ) Notice: Subject to any disclaimer, the term of this patent is extended or adjusted under 35 U.S.C. 154(b) by 0 days.

(21) Appl. No.: 09/490,894

(22) Filed: Jan. 27, 2000

Related U.S. Application Data

(63) Continuation of application No. PCT/JP99/02810, filed on May 27, 1999.

(30) Foreign Application Priority Data

| May 27, 1998 | (JP) | 10-164177 |
| Jun. 30, 1998 | (JP) | 10-201145 |
| Oct. 7, 1998 | (JP) | 10-301637 |
| Nov. 30, 1998 | (JP) | 10-377868 |
| Dec. 25, 1998 | (JP) | 10-371599 |
| Mar. 11, 1999 | (JP) | 11-065476 |
| May 6, 1999 | (JP) | 11-126341 |

(51) Int. Cl.$^7$ ............................................. B32B 5/16

(52) U.S. Cl. .............. 428/336; 428/699; 428/210; 428/195; 428/402; 428/409; 4/619; 4/624; 4/222; 4/292; 4/420; 4/301; 501/14; 501/27; 427/193; 427/279; 427/287; 427/375; 427/376.1

(58) Field of Search .................. 428/699, 454, 428/701, 702, 428, 195, 210, 336, 409, 402, 689, 426, 432, 446; 4/619, 624, 222, 292, 420, 301; 501/14, 27, 31, 53, 54; 427/193, 189, 201, 279, 287, 375, 372.2, 376.1, 376.2, 397.7

(56) References Cited

U.S. PATENT DOCUMENTS 5,304,516 A * 4/1994 Clifford

OTHER PUBLICATIONS

Communication from European Patent Office dated Jan. 30, 2002, for European Patent Application Serial No. 01124793.9–2111 enclosing European Search Report for application.

(List continued on next page.)

*Primary Examiner*—Deborah Jones
*Assistant Examiner*—Wendy Boss
(74) *Attorney, Agent, or Firm*—Jones Day

(57) ABSTRACT

Sanitary wares having a controlled surface are disclosed which are less likely to be stained or soiled and/or possess excellent gloss. The first sanitary ware comprises a sanitary ware body and a surface glaze layer provided on the sanitary ware body, wherein the surface glaze layer has a center line average roughness Ra of less than 0.07 μm. This sanitary ware is advantageous in that stains or soils are much less likely to be adhered to the surface thereof and, even when adhered to the surface thereof, can be removed by a weak water stream. The second sanitary ware comprises a sanitary ware body and a surface glaze layer provided on the sanitary ware body, wherein the surface glaze layer has a kurtosis Rku of less than 2.70. This sanitary ware advantageously possesses excellent surface gloss. The third sanitary ware comprises a sanitary ware body and a surface glaze layer provided on the sanitary ware body, wherein the surface of the surface glaze layer consists essentially of a vitreous component and is free from silica particles having a particle diameter of not less than 10 μm. This sanitary ware is advantageous in that stains or soils are less likely to be adhered to the surface thereof.

33 Claims, 15 Drawing Sheets

OTHER PUBLICATIONS

Communication from European Patent Office dated Jan. 30, 2002, for European Patent Application Serial No. 01124792.1–2111 enclosing European Search Report for application.

* cited by examiner

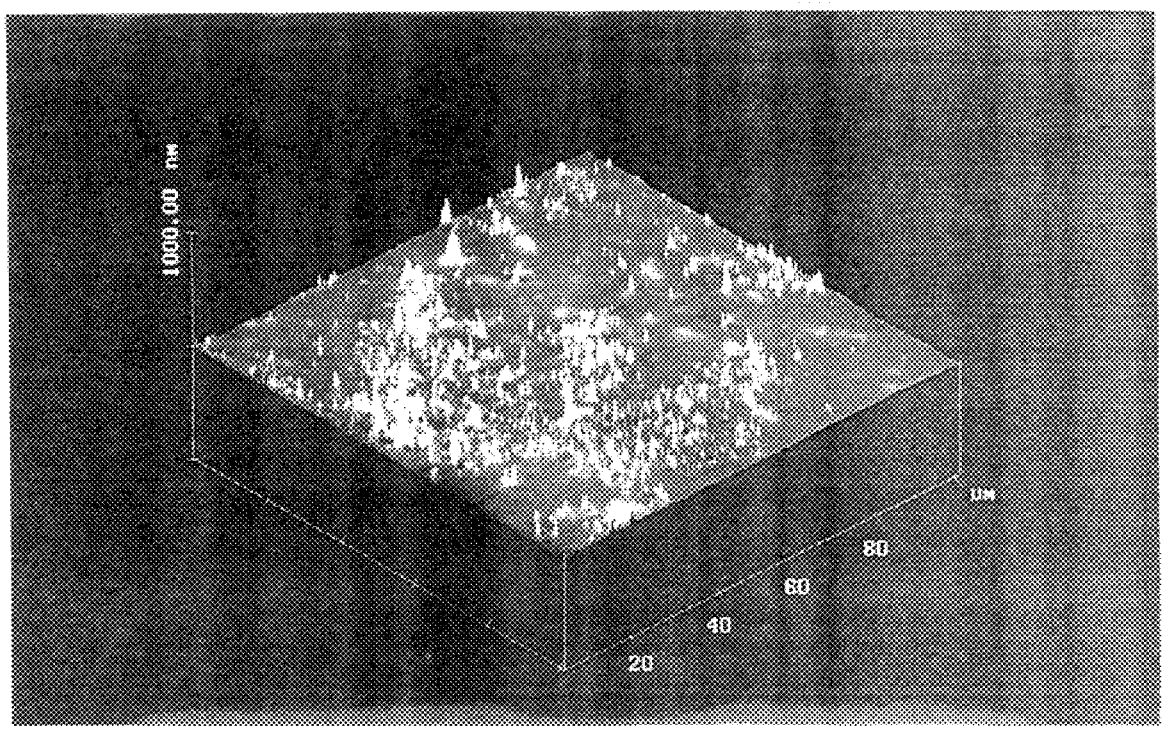
F I G. 11

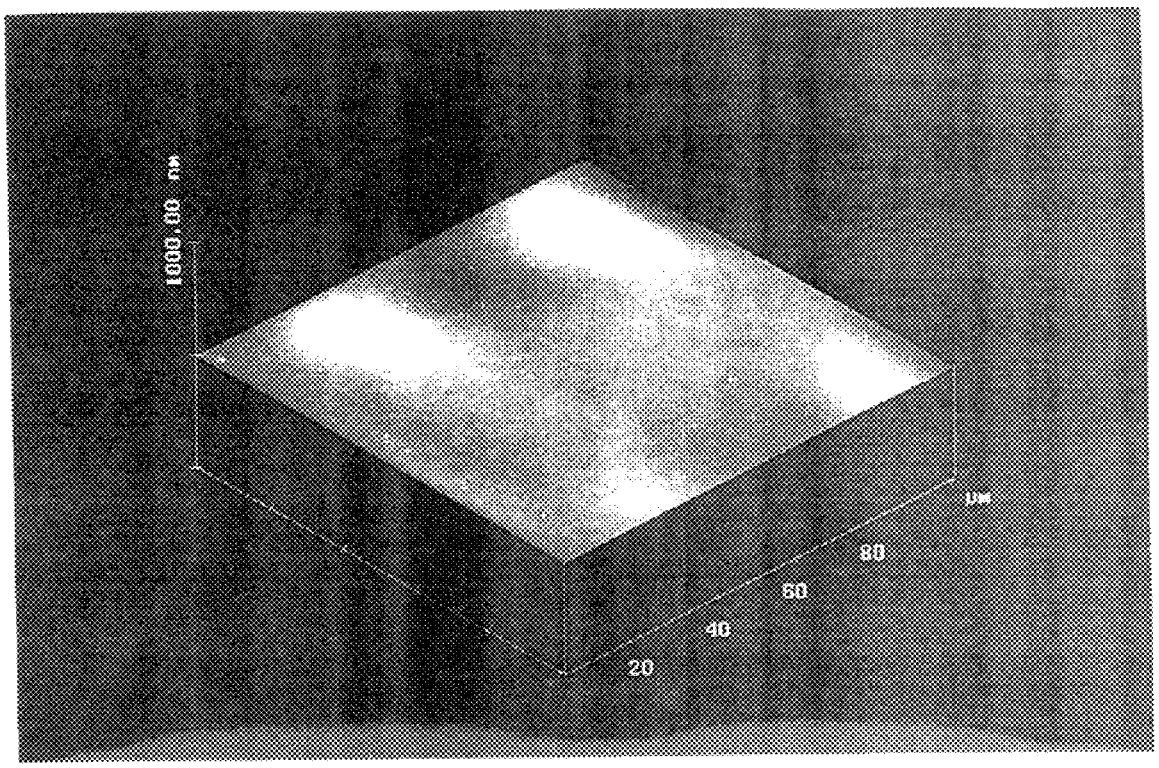
F I G. 12

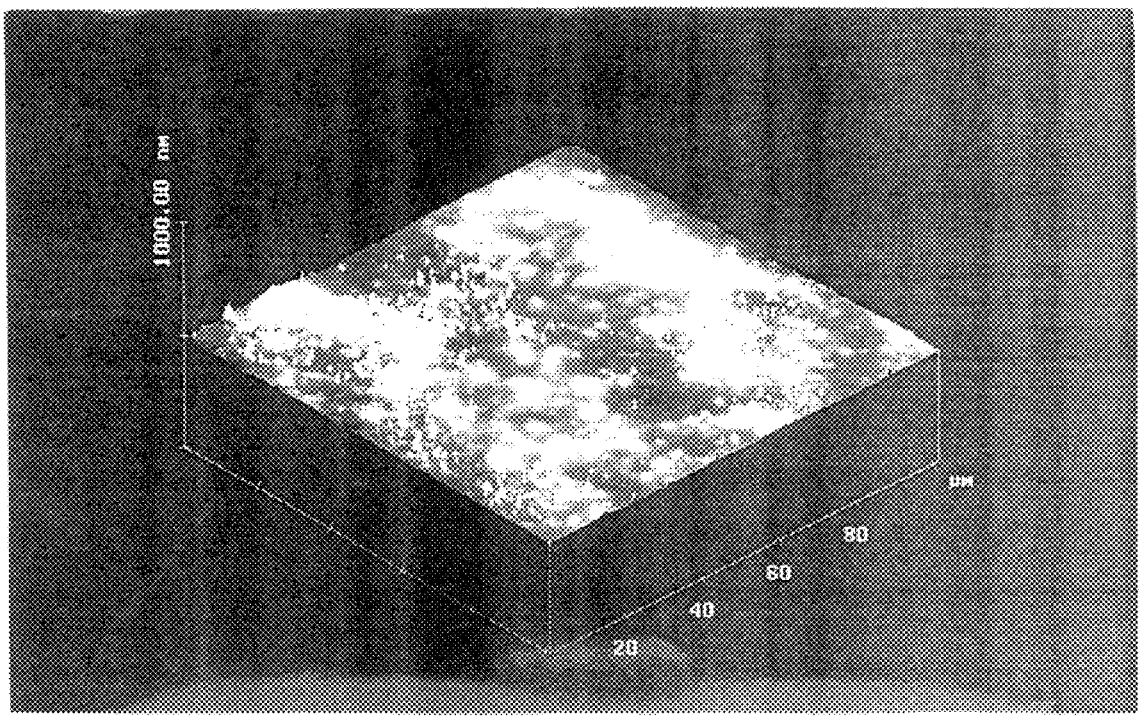
F I G. 13

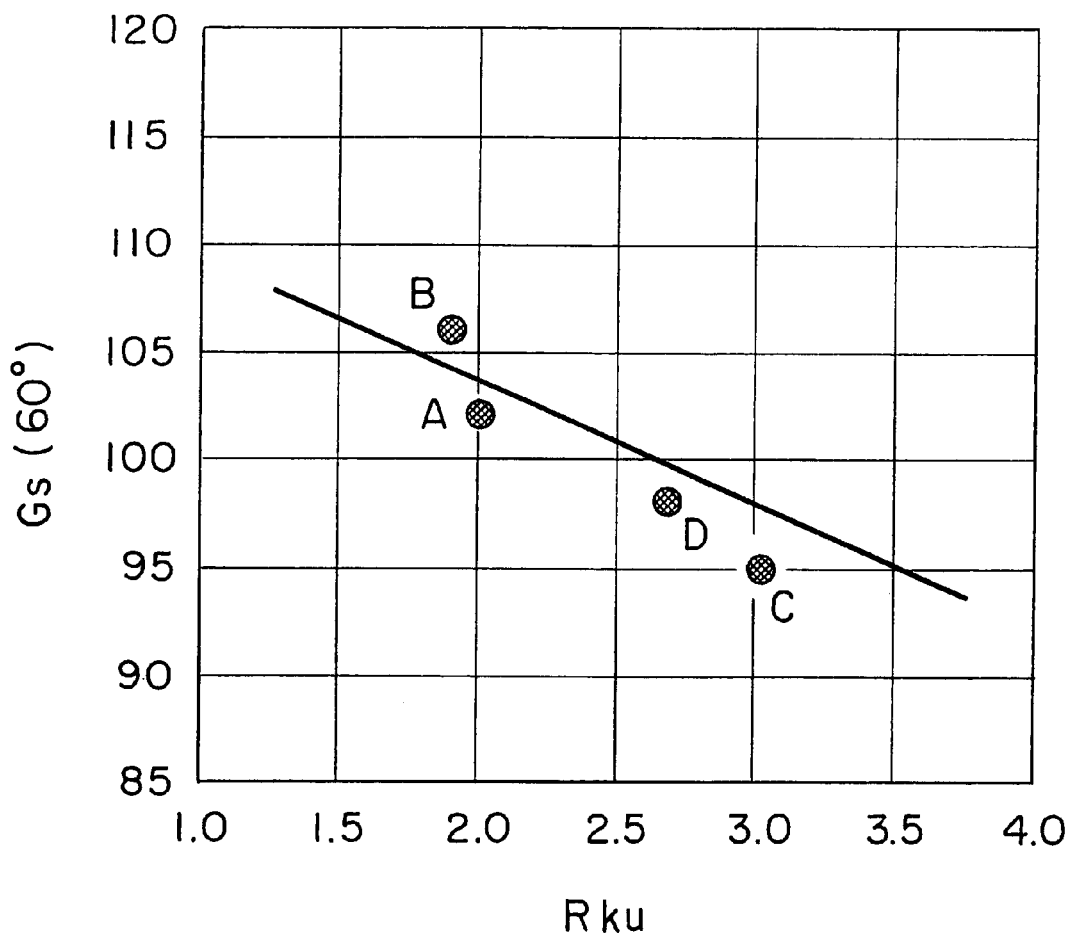
F I G. 15

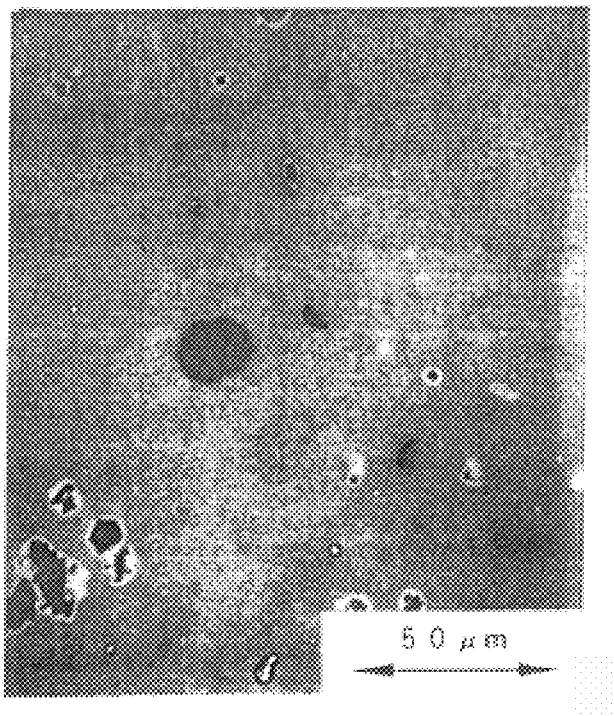
F I G. 16
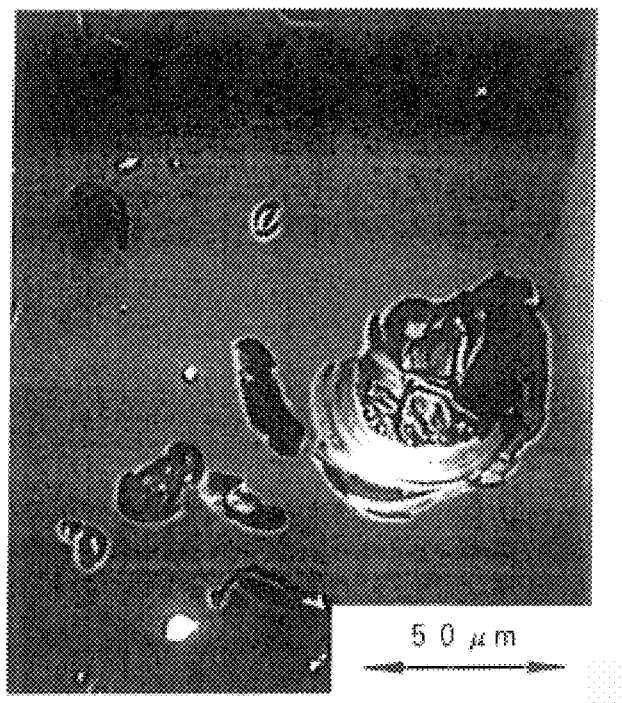
F I G. 17

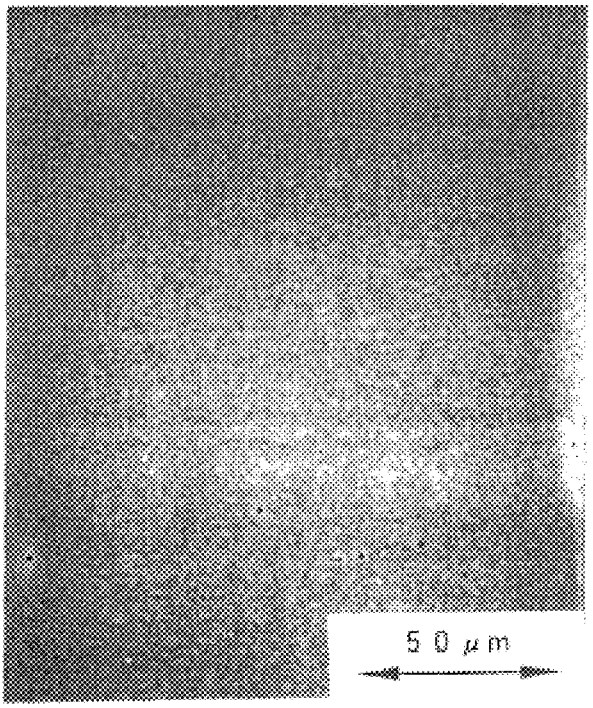
F I G. 18
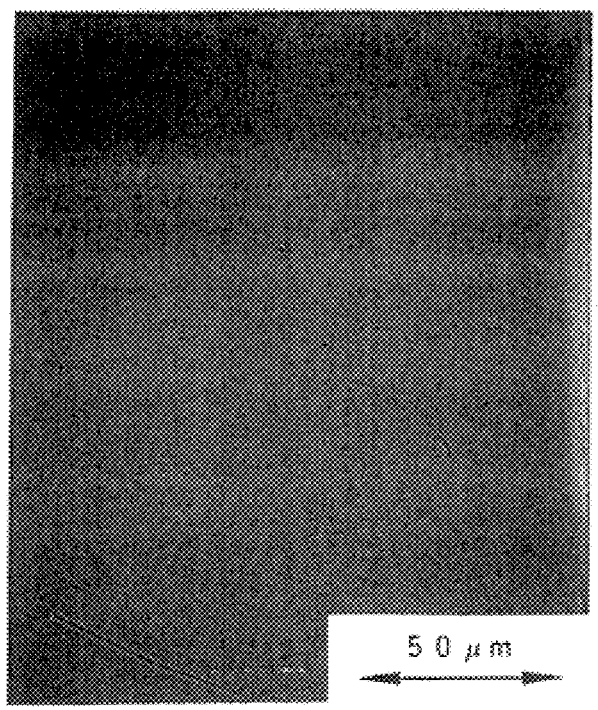
F I G. 19

SANITARY WARE AND PROCESS FOR PRODUCING THE SAME

This application claims the benefit of and is a continuation of International Application No. PCT/JP99/02810, which has the international filing date of May 27, 1999, and which was not published under PCT Article 21(2) in English.

BACKGROUND OF THE INVENTION

1. Field of the Invention

The present invention relates to sanitary wares, such as toilets, urinals, strainers for urinals, flush tanks for toilets or urinals, washbowls in washstands, or wash hand basins, and a process for producing the same.

2. Background Art

Good appearance and high cleanness are important for the surface of sanitary wares from the viewpoints of hygiene and aesthetic effect. Further, retention of good appearance and high cleanness for a long period of time is preferred.

In order to keep the surface of sanitary wares clean and to retain good appearance of the surface of sanitary wares, it is a common practice to strongly scrub the surface thereof by a scrubbing brush or a cleaning brush containing a detergent, such as a surfactant, an acid detergent, or an alkali detergent. Specifically, stains or soils deposited on the surface of sanitary wares are removed through utilization of chemical detergency derived from the detergent and through utilization of physical cleaning action by scrubbing with the scrubbing brush or the cleaning brush.

This cleaning work is not light, and, hence, reducing the frequency of the cleaning work is desired. Further, in recent years, environmental pollution by surfactant-containing wastewater has been pointed out. Therefore, reducing the amount of the surfactant used and the frequency of use of the surfactant is desired.

Under these circumstances, several proposals have been made on sanitary wares having a surface that is highly hygienic and has good appearance.

For example, coating of a fluororesin or a siloxane resin containing fluoroalkyl groups onto the surface of sanitary ware has been proposed to lower the surface energy, thereby permitting stains or soils to be less likely to be deposited onto the surface.

Another proposal is such that the surface of sanitary ware is made smooth as much as possible to prevent stains or soils from being deposited and strongly adhered onto the surface thereof. In this proposal, however, the relationship of the surface state to the inhibition of deposition of stains or soils, fastness, and glossiness has not been fully studied. Specifically, the sanitary ware having a smooth surface has been proposed based on such mere conceptual understanding that a smooth surface would inhibit the deposition of stains or soils thereon and would be preferred from the viewpoint of aesthetic effect.

SUMMARY OF THE INVENTION

The present inventors have now found that control of the surface state of a glaze layer can provide sanitary wares that are less likely to be stained and soiled and/or possess excellent gloss.

Accordingly, it is an object of the first aspect of the present invention to provide a sanitary ware that is less likely to be stained and soiled on the surface thereof and, upon deposition of stains or soils on the surface thereof, permits the stains or soils to be removed by a weak stream of water.

It is an object of the second aspect of the present invention to provide a sanitary ware that possesses excellent surface gloss.

It is an object of the third aspect of the present invention to provide a sanitary ware that is less likely to be stained and soiled.

According to the first aspect of the present invention, there is provided a sanitary ware comprising: a sanitary ware body; and a surface glaze layer provided on the sanitary ware body, the surface glaze layer having a center line average roughness Ra of less than 0.07 $\mu$m as measured with a stylus type surface roughness tester according to JIS B 0651-1996.

According to the second aspect of the present invention, there is provided a sanitary ware comprising: a sanitary ware body; and a surface glaze layer provided on the sanitary ware body, the surface glaze layer having a kurtosis Rku of less than 2.70.

According to the third aspect of the present invention, there is provided a sanitary ware comprising: a sanitary ware body; and a surface glaze layer provided on the sanitary ware body, the surface of the surface glaze layer consisting essentially of a vitreous component and, in addition, being free from silica particles having a size of not less than 10 $\mu$m.

BRIEF DESCRIPTION OF THE DRAWINGS

FIG. 11 is a diagram showing the state of the surface of earthenware in Example A1 obtained by observation under an atomic force microscope;

FIG. 12 is a diagram showing the state of the surface of earthenware in Example A2 obtained by observation under an atomic force microscope;

FIG. 13 is a diagram showing the state of the surface of earthenware in Example A3 obtained by observation under an atomic force microscope;

FIG. 15 is a graph showing the relationship between kurtosis Rku and glossiness Gs (60°) in Example B and Comparative Example B;

FIG. 16 is a reflection electron image of the glaze surface before an alkali resistance test in Comparative Example C2 observed under a scanning electron microscope;

FIG. 17 is a reflection electron image of the glaze surface after an alkali resistance test in Comparative Example C2 observed under a scanning electron microscope;

FIG. 18 is a reflection electron image of the glaze surface before an alkali resistance test in Example C2 observed under a scanning electron microscope;

FIG. 19 is a reflection electron image of the glaze surface after an alkali resistance test in Example C2 observed under a scanning electron microscope;

DETAILED DESCRIPTION OF THE INVENTION

Definition

Figure 1:
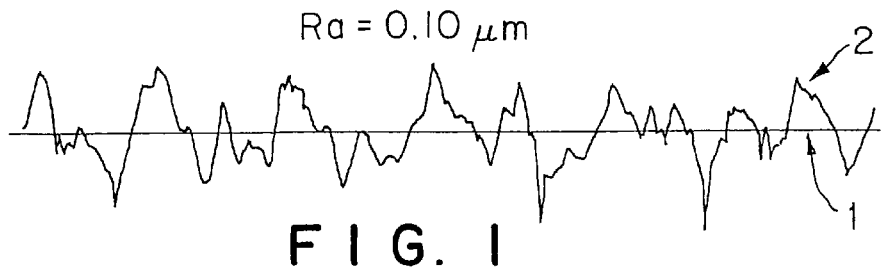
FIG. 1 is an enlarged diagram showing the state of the surface of earthenware in Comparative Example A1 as measured with a stylus type surface roughness tester (JIS B 0651), wherein numeral 1 designates a center line and numeral 2 the surface of a glaze layer.

The term "sanitary ware" used herein refer to earthenware products used in or around lavatories and washrooms, and specific examples thereof include toilets, urinals, strainers for urinals, flush tanks for toilets or urinals, washbowls in washstands, and wash hand basins.

The term "earthenware" used herein refers to a ceramic ware the body of which has been densified to such an extent that the body has slight water absorption, the ceramic ware having a glazed surface.

The particle diameter obtained by particle size distribution measurement according to laser diffractometry, for example "50% particle diameter," refers to a particle diameter when the accumulated number of fine particles counted from the finer particle side in measured data on particle size distribution measured by laser diffractometry has reached 50% of the particles. In the following description, the particle diameter referred to together with the "50% particle diameter" or "particle diameter of D50" means "50% particle diameter" obtained by particle size distribution measurement according to laser diffractometry.

Sanitary Ware According to First Aspect of the Invention

The sanitary ware according to the first aspect of the present invention comprises: a sanitary ware body; and a surface glaze layer provided on the sanitary ware body, the surface glaze layer having a center line average roughness Ra of less than 0.07 $\mu$m. According to a preferred embodiment of the present invention, the center line average roughness Ra is preferably not more than 0.068 $\mu$m, more preferably not more than 0.05 $\mu$m, most preferably not more than 0.03 $\mu$m. So far as the present inventors know, no product having a surface roughness controlled to the above range has hitherto been proposed in sanitary ware fields, and the surface roughness Ra of commercially available products is about 0.1 $\mu$m at best.

According to the sanitary ware of the present invention, urinary claculi, mold, materials, which render the surface of the sanitary ware yelowish, and other stains or soils are less likely to be deposited on the surface thereof, and, even when deposited on the surface, can be removed by a weak stream of water. As a result, the surface of the sanitary ware can be kept clean for a long period of time without frequent water flushing. It has been known that stains or soils are less likely to be deposited on a smooth surface. The effect of the present invention is surprisingly much better than that expected from the conventional finding. For example, as is apparent from working examples described below, according to the sanitary ware of the present invention, smears of a marking ink (Magic™ ink), upon contact with water, are floated on water, and can be removed by running water. This is true of a salad oil. Further, scale and urinary calculi are much less likely to be deposited, and, even when deposited on the surface of the sanitary ware, can be easily removed. The high level of inhibition of the deposition of stains or soils on the surface of the sanitary ware and the high removability of stains and soils are utterly unexpected and anticipated from the conventional finding. The above effect is significant when the center line average roughness is in the above range. When the center line average roughness is outside the above range, the effect is significantly lost. That is, the above center line average roughness range is critical for attaining the above significant effect.

Although the reason why the effect of the present invention can be attained has not been fully elucidated yet, it is believed as follows. The area of contact between stains or soils and the surface is considered to decrease with increasing the smoothness of the surface. Consequently, the adhesion between the surface and the stains or soils is considered to decrease with increasing the smoothness of the surface. In this case, when the stains or soils are surrounded by water, a smoother surface having a lower adhesion to the stains or soils permits stains or soils to be more easily floated on and removed by water, because buoyancy acting on the stains or soils is proportional to the size of the stains or soil. This way of thinking is an extension of the conventional finding, and is unsatisfactory for explaining the criticality of the center line average roughness range for attaining the effect of the present invention. In the present invention, it is estimated that, when the level of the smoothness (center line average roughness) is in the above range, a great change occurs in interaction between the stains or soils and the glaze surface. This, however, is mere estimation, and the present invention is not limited to this way of thinking.

The "center line average roughness or roughness average Ra" means the value obtained by the following formula and expressed in micrometer (m) when sampling only the reference length from the roughness curve in the direction of mean line, taking X-axis in the direction of mean line and Y-axis in the direction of longitudinal magnification of this sampled part and the roughness curve is expressed by Y=f(x):

$$R_n = 1/l \int_0^l |f(x)| dx$$

wherein represents reference length).

In the present invention, the center line average roughness Ra is in accordance with the definition and designation specified in JIS B 0601-1994 and measured with a stylus type surface roughness tester according to JIS B 0651-1996. These JIS, together with English translation thereof, are easily available from Japanese Standards Association (1-24, Akasaka 4-chome, Minato-ku, Tokyo, Japan), and are incorporated herein by reference.

Figure 24:
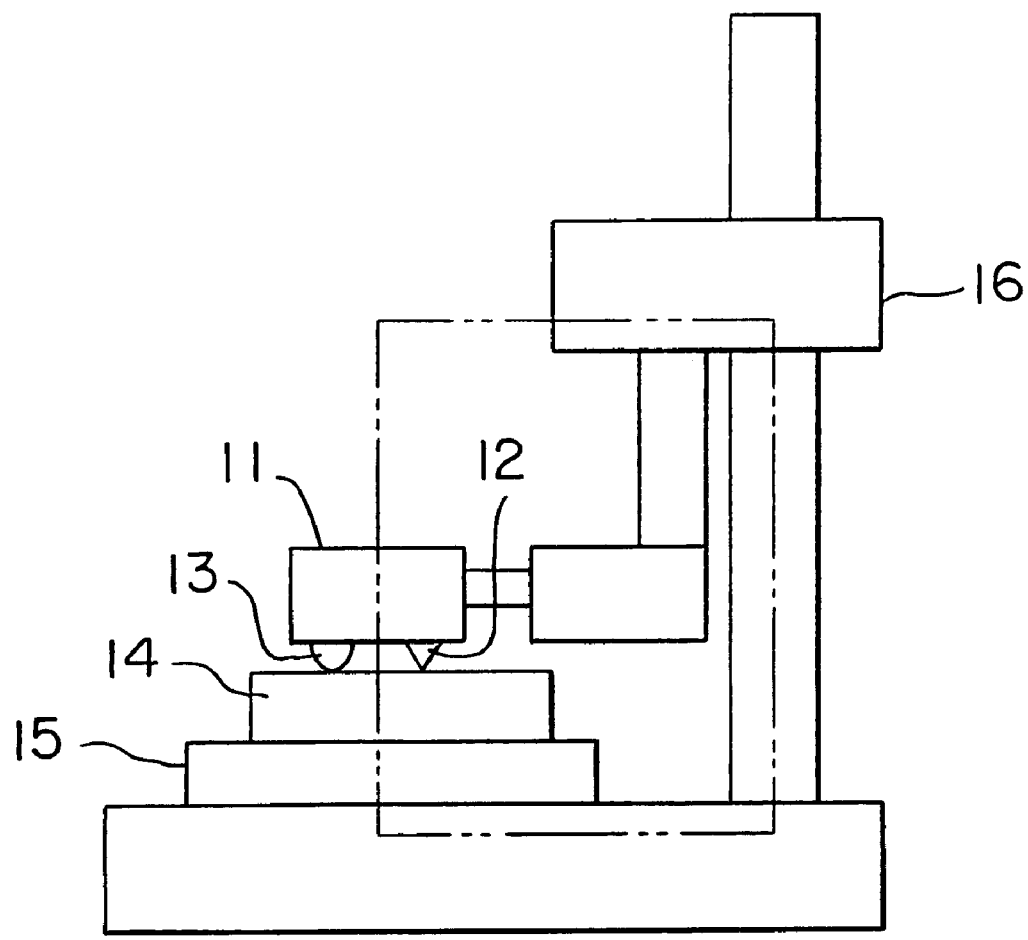
FIG. 24 is a schematic diagram showing a stylus type surface roughness tester according to JIS B 0651-1996.

The roughness tester is schematically shown in FIG. 24. In the drawing, a detector 11 comprises a stylus 12 and a skid 13. The detector 11 detects displacement in the vertical direction, while it is traveled on the surface of a sample 14 put on a fixing jig 15 by means of feeding device 16. This displacement is passed through a magnifying device (not shown), and displayed on an indicator or a recorder to obtain a surface roughness curve.

The present inventors have found that a preferred formulation and a more preferred formulation of the glaze are as follows, although the effect of the present invention does not greatly depend upon the composition of the glaze.

| | Formulation, wt % | |
|---|---|---|
| | Preferred range | More preferred range |
| $SiO_2$: | 55 to 80 | 60 to 80 |
| $Al_2O_3$: | 5 to 13 | 5 to 10 |
| $Fe_2O_3$: | 0.1 to 0.4 | 0.1 to 0.4 |
| MgO: | 0.8 to 3.0 | 0.8 to 3.0 |
| CaO: | 8 to 17 | 8 to 15 |
| ZnO: | 3 to 8 | 4 to 8 |
| $K_2O$: | 1 to 4 | 1 to 4 |
| $Na_2O$: | 0.5 to 2.5 | 0.5 to 2.5 |
| $ZrO_2$: | 0.1 to 15 | 0.1 to 15 |
| Pigment: | 1 to 20 | 1 to 20 |

According to a preferred embodiment of the present invention, an additional function can be imparted to the glaze layer by adding additives, other than the glaze, to the glaze layer. In this case, additives, which may be preferably added to the glaze, are such that they are reacted with the glaze or the atmosphere within the kiln during firing to form a compound. For example, antimicrobial effect can be provided, for example, by the addition of antimicrobial metals, such as silver, copper, zinc, or compounds and solid solutions thereof, and photocatalysts, such as titanium oxide, zinc oxide, tin oxide, ferric oxide, tungsten trioxide, strontium titanate, and dibismuth trioxide. Further, the presence of the photocatalyst can also offer photoreduction effect that can promote hydrophilification.

According to the present invention, the thickness of the surface glaze layer may be properly determined. For example, the thickness is generally about 0.1 to 3 mm, preferably about 0.2 to 2 mm, more preferably 0.3 to 1.2 mm.

According to a preferred embodiment of the present invention, the surface glaze layer is absent on a part of the surface of the sanitary ware according to the present invention. The sanitary ware according to the present invention is preferably produced by a production process described below. In this case, gases evolved during firing are released through portions not provided with the glaze layer. This can effectively prevent gases from being introduced into and stayed in the glaze layer, and hence can effectively prevent the occurrence of poor appearance. This embodiment is particularly advantageous when firing is carried out at a time after coating of a glaze material onto the sanitary ware body.

According to another embodiment of the present invention, a glaze layer is provided between the sanitary ware body and the surface glaze layer. In this case, the glaze layer may have a multi-layer structure so far as the surface of the surface glaze layer as the outermost layer has Ra falling within the above defined range. More specifically, according to a preferred embodiment of the present invention, a color glaze layer is provided between the sanitary ware body and the surface glaze layer, and the surface glaze layer is transparent. According to this embodiment, the thickness of the surface glaze layer may be reduced, and even when the surface glaze layer has become very soft during firing, it is possible to effectively prevent such an unfavorable phenomenon that gases enter and are stayed in the glaze layer and consequently create poor appearance. Further, when zinc is contained as the glaze component, the zinc component is vaporized during firing, and deposited as zinc flowers within a kiln, resulting in contamination of the firing kiln. When the surface glaze layer is provided, however, zinc vaporized in the glaze layer as the intermediate layer cannot be introduced into the atmosphere within the kiln without passage through the surface glaze layer. Therefore, when the glaze layer is formed so as to have a two-layer structure with the total thickness of the two layers being equal to the thickness of the glaze layer formed in a single layer structure, the contamination of the kiln with zinc flowers can be more fully inhibited as compared with the provision of the glaze layer in a single layer structure, that is, the provision of the surface glaze layer alone as the glaze layer. Further, zinc is concentrated on the surface so that the concentration of zinc in the composition is gradually increased toward the surface, leading to an advantage that the antimicrobial activity is exhibited for a long period of time. Also according to this embodiment, as described above, preferably, the glaze layer is absent on a part of the sanitary ware.

According to another preferred embodiment of the present invention, the contact angle of the surface glaze layer in the sanitary ware of the present invention with water is preferably less than 30°, more preferably not more than 25°, most preferably not more than 20°. In this case, by virtue of the hydrophilic nature of the surface glaze layer, stains and soils are less likely to be deposited, and, even when deposited on the surface thereof, can be easily removed. Thus, the effect of the present invention can be attained on a higher level.

As described above, the sanitary ware according to the present invention is specifically in the form of toilets, urinals, strainers for urinals and the like. In the toilets and urinals, the deposition of materials, which render the surface thereof yellowish, and the like onto the bowl portion or the trap portion can be effectively prevented, and, even though these material are once deposited, they can be easily removed. Further, the sanitary ware according to the present invention may be in the form of washbowls in washstands. In washbowls, the deposition of soap soils, scale soils and the like can be effectively prevented, and, even though these soils are once deposited, they can be easily removed.

According to a preferred embodiment of the present invention, the sanitary ware of the present invention can be produced by providing any one of the following glaze materials for a surface glaze layer, applying the glaze material on a sanitary ware body, and firing the sanitary ware body with the glaze material applied thereon:

(1) a glaze material having a 50% particle diameter (D50) of 1.5 μm as determined by particle size distribution measurement according to laser diffractometry;

(2) an amorphous glaze material such as a vitrified frit glaze material; and (3) a mixed glaze comprised of an amorphous glaze material such as a vitrified frit glaze material and a non-frit glaze material.

The sanitary ware body may be any conventional sanitary ware body which is prepared, for example, by properly shaping a slurry for a sanitary ware body obtained using quartz sand, feldspar, clay and the like as raw materials.

The glaze material (1) may be provided by grinding the glaze material powder by means of a ball mill or the like. Use of the ground glaze material can provide a sanitary ware having a smooth surface according to the present invention.

The amorphous glaze material such as the vitrified frit glaze material (2) may be obtained by melting a glaze material powder at a high temperature of 1300° C. or above. Use of the previously vitrified glaze material can provide a sanitary ware having a smooth surface according to the present invention.

The glaze material (3) is a mixture of an amorphous glaze material such as a vitrified frit glaze material with a non-frit glaze material. The amorphous glaze material may be obtained in the same manner as described above in connection with the glaze material (2).

The particle diameter of the non-frit glaze material powder is not particularly limited. However, the smaller the particle diameter of the non-frit glaze material, the better the results. More specifically, the 50% particle diameter of the non-frit glaze material is preferably not more than 6 μm, more preferably not more than 4 μm, particularly preferably not more than 1.5 μm.

According to a preferred embodiment of the present invention, in the glaze material (3), at least silica particles in the glaze material powder have been subjected to size reduction to a 50% particle diameter of not more than 6 μm, more preferably not more than 4 μm. According to this embodiment, the amount of silica particles remaining unreacted on the surface after firing can be reduced. The present inventors have found that, when the sanitary ware is a toilet or a urinal which is used in an environment exposed to an alkali solution (an ammonia-containing solution), portions around the silica particles are preferentially deteriorated, resulting in lowered smoothness of the surface. More specifically, silica particles or zircon particles left on the glaze surface after firing constitute irregularities on the surface. It was found that sites around the silica particles or zircon particles constituting the irregularities are preferentially deteriorated in a very short period of about two months under an alkaline environment. The creation of irregularities can be effectively prevented by controlling the diameter of the silica particles. This can offer an advantage that the alkali resistance of the surface glaze layer is significantly improved.

According to a preferred embodiment of the present invention, in the glaze material (3), when the non-frit glaze material has not been satisfactorily subjected to size reduction, for example, has a 50% particle diameter of about 6 m, the content of the amorphous glaze material such as the frit glaze material in the mixed glaze is preferably not more than 50% by weight, more preferably not more than 30% by weight. This can prevent gases evolved during firing from being stayed in the glaze layer and hence can prevent the occurrence of poor appearance.

In some cases, preferably, the frit glaze material has a softening temperature above that of the non-frit glaze material powder. This also can prevent gases evolved during firing from being stayed in the glaze layer and hence can prevent the occurrence of poor appearance.

The glaze material may be applied to the sanitary ware body by any method without particular limitation, and a conventional method may be properly selected from spray coating, dip coating, spin coating, roll coating and the like.

The sanitary ware body with the precursor layer for a surface glaze layer being formed thereon is then fired. The firing temperature may vary depending upon whether or not the sanitary ware body has been previously sintered. When the ware body has not been previously sintered, firing is preferably carried out at a temperature of 1000° C. or above which causes sintering of the ware body and softening of the glaze. On the other hand, when the ware body has been previously sintered, firing is preferably carried out at a temperature of 300° C. or above, more preferably 400° C. or above, which can soften the glaze. The former method, that is, a method wherein, after a glaze material is coated onto the unsintered ware body, firing is carried out at a time, is preferred from the viewpoint of the production cost of the sanitary ware.

On the other hand, the latter method is advantageous in that the formation of a surface glaze layer on the completed sanitary ware can impart a new function.

The sanitary ware comprising an additional glaze layer between the sanitary ware body and the surface glaze layer may be produced in the same manner as described above, except that the step of forming a precursor layer for the glaze layer as the intermediate layer is added. Specifically, this sanitary ware may be produced in the same manner as described above, except that a precursor layer for the glaze layer as the intermediate layer, for example, a precursor for a color glaze layer is formed and a precursor for the surface glaze layer is formed thereon from any one of the glaze materials (1) to (3).

In this case, the thickness of the surface glaze layer is generally 0.05 to 1.2mm, preferably 0.1 to 0.8mm, more preferably 0.15 to 0.4 mm. The thickness of the color glaze layer is generally 0.05 to 1.8 mm, preferably 0.1 to 1.2 mm, more preferably 0.2 to 0.7 mm.

According to a preferred embodiment of the present invention, when the color glaze layer is formed between the sanitary ware body and the surface glaze layer, the D50 of the glaze material capable of forming the color glaze layer is preferably not less than 4 μm. A combination of the use of the color glaze material having such a particle diameter with the use of any one of the glaze materials (1) to (3) can prevent gases evolved during firing from being stayed in the glaze layer and hence can prevent the occurrence of poor appearance.

Further, according to a preferred embodiment of the first aspect of the present invention, when the color glaze layer is formed between the sanitary ware body and the surface glaze layer, the use of the mixed glaze (3) is preferred. More preferably, the mixed glaze (3) used is such that the non-frit glaze material has been subjected to size reduction to a 50% particle diameter of not more than 6 μm and is free from a pigment and/or an emulsifier (specifically $ZrO_2$). In this case, 50 to 99% by weight, preferably 60 to 95% by weight, of the mixed glaze is accounted for by the frit glaze material. Most preferably, the ratio of the non-frit glaze material to the frit glaze material is 30:70 to 10:90. In this case, the firing temperature is preferably 800 to 1300° C. In summary, the preferred production process comprises the steps of: applying a color glaze material with a pigment and an emulsifier added thereto onto a sanitary ware body; further applying a mixed glaze, prepared by mixing a transparent non-frit glaze material containing neither a pigment nor an emulsifier with 50 to 99% by weight, preferably 60 to 90% by weight, of a frit glaze; and then conducting firing at a temperature of 800 to 1300° C.

Sanitary Ware According to Second aspect of the Invention

The sanitary ware according to the second aspect of the present invention comprises: a sanitary ware body; and a surface glaze layer provided on the sanitary ware body, the surface glaze layer having a kurtosis Rku of less than 2.70, preferably not more than 2.6, more preferably not more than 2.50.

The sanitary ware according to the second aspect of the present invention has excellent surface gloss.

According to the present invention, the kurtosis Rku is defined as follows. Specifically, the kurtosis Rku is determined from Y=f(x) in the roughness curve explained above in connection with the first embodiment by the following equation:

$$Rq = \sqrt{\frac{1}{l}\int_0^l f(x)^2 dx}$$

The kurtosis Rku is a parameter for quantitatively expressing the acuteness of an amplitude distribution curve and can be determined by the following equation:

$$Rku = \frac{1}{LRq^4}\int_0^l f(x)^4 dx$$

As with the sanitary ware according to the first aspect of the present invention, the sanitary ware according to the second aspect of the present invention may be in the form of toilets, urinals, strainers for urinals, washbowls in washstands and the like. In the sanitary ware according to the second aspect of the present invention, the composition of the glaze layer, the thickness thereof, other preferred embodiments and the production process thereof, may be the same as described above in connection with the first aspect of the present invention.

The present inventors have found that a preferred formulation and a more preferred formulation of the glaze are as follows, although the effect of the present invention does not greatly depend upon the composition of the glaze.

| | Formulation, wt % | |
|---|---|---|
| | Preferred range | More preferred range |
| $SiO_2$: | 55 to 80 | 60 to 80 |
| $Al_2O_3$: | 5 to 13 | 5 to 10 |
| $Fe_2O_3$: | 0.1 to 0.4 | 0.1 to 0.4 |
| MgO: | 0.8 to 3.0 | 0.8 to 3.0 |
| CaO: | 8 to 17 | 8 to 15 |
| ZnO: | 3 to 8 | 4 to 8 |
| $K_2O$: | 1 to 4 | 1 to 4 |
| $Na_2O$: | 0.5 to 2.5 | 0.5 to 2.5 |
| $ZrO_2$: | 0.1 to 15 | 0.1 to 15 |
| pigment: | 1 to 20 | 1 to 20 |

According to a preferred embodiment of the present invention, an additional function can be imparted to the glaze layer by adding additives, other than the glaze, to the glaze layer. In this case, additives, which may be preferably added to the glaze, are such that they are reacted with the glaze or the atmosphere within the kiln during firing to form a compound. For example, antimicrobial effect can be provided, for example, by the addition of antimicrobial metals, such as silver, copper, zinc, or compounds and solid solutions thereof, and photocatalysts, such as titanium oxide, zinc oxide, tin oxide, ferric oxide, tungsten trioxide, strontium titanate, and dibismuth trioxide. Further, the presence of the photocatalyst can also offer photoreduction effect that can promote hydrophilification.

According to the present invention, the thickness of the surface glaze layer may be properly determined. For example, the thickness is generally about 0.1 to 3 mm, preferably about 0.2 to 2 mm, more preferably 0.3 to 1.2 mm.

According to a preferred embodiment of the present invention, the surface glaze layer is absent on a part of the surface of the sanitary ware according to the present invention. The sanitary ware according to the present invention is preferably produced by a production process described below. In this case, gases evolved during firing are released through portions not provided with the glaze layer. This can effectively prevent gases from being introduced into and stayed in the glaze layer, and hence can effectively prevent the occurrence of poor appearance. This embodiment is particularly advantageous when firing is carried out at a time after coating of a glaze material onto the sanitary ware body.

According to another embodiment of the present invention, a glaze layer is provided between the sanitary ware body and the surface glaze layer. In this case, the glaze layer may have a multi-layer structure so far as the surface of the surface glaze layer as the outermost layer has Rku falling within the above defined range. More specifically, according to a preferred embodiment of the present invention, a color glaze layer is provided between the sanitary ware body and the surface glaze layer, and the surface glaze layer is transparent. According to this embodiment, the thickness of the surface glaze layer may be reduced, and even when the surface glaze layer has become very soft during firing, it is possible to effectively prevent such an unfavorable phenomenon that gases enter and are stayed in the glaze layer and consequently create poor appearance. Further, when zinc is contained as the glaze component, the zinc component is vaporized during firing, and deposited as zinc flowers within a kiln, resulting in contamination of the firing kiln. When the surface glaze layer is provided, however, zinc vaporized in the glaze layer as the intermediate layer cannot be introduced into the atmosphere within the kiln without passage through the surface glaze layer. Therefore, when the glaze layer is formed so as to have a two-layer structure with the total thickness of the two layers being equal to the thickness of the glaze layer formed in a single layer structure, the contamination of the kiln with zinc flowers can be more fully inhibited as compared with the provision of the glaze layer in a single layer structure, that is, the provision of the surface glaze layer alone as the glaze layer. Further, zinc is concentrated on the surface so that the concentration of zinc in the composition is gradually increased toward the surface, leading to an advantage that the antimicrobial activity is exhibited for a long period of time. Also according to this embodiment, as described above, preferably, the glaze layer is absent on a part of the sanitary ware.

In this case, the thickness of the surface glaze layer is generally 0.05 to 1.2 mm, preferably 0.1 to 0.8 mm, more preferably 0.15 to 0.4 mm. The thickness of the color glaze layer is generally 0.05 to 1.8 mm, preferably 0.1 to 1.2 mm, more preferably 0.2 to 0.7 mm.

According to a preferred embodiment of the present invention, the sanitary ware of the present invention can be produced by providing any one of the following glaze materials for a surface glaze layer, applying the glaze material on a sanitary ware body, and firing the sanitary ware body with the glaze material applied thereon:

(1) a glaze material having a 50% particle diameter (D50) of 1.5 µm as determined by particle size distribution measurement according to laser diffractometry;

(2) an amorphous glaze material such as a vitrified frit glaze material; and (3) a mixed glaze comprised of an amorphous glaze materila such as a vitrified frit glaze material and a non-frit glaze material.

The sanitary ware body may be any conventional sanitary ware body which is prepared, for example, by properly shaping a slurry for a sanitary ware body obtained using quartz sand, feldspar, clay and the like as raw materials.

The glaze material (1) may be provided by grinding the glaze material powder by means of a ball mill or the like. Use of the ground glaze material can provide a sanitary ware having a smooth surface according to the present invention.

The amorphous glaze material such as the vitrified frit glaze material (2) may be obtained by melting a glaze material powder at a high temperature of 1300° C. or above. Use of the previously vitrified glaze material can provide a sanitary ware having a smooth surface according to the present invention.

The glaze material (3) is a mixture of an amorphous glaze material such as a vitrified frit glaze material with a non-frit glaze material. The amorphous glaze material may be obtained in the same manner as described above in connection with the glaze material (2).

The particle diameter of the non-frit glaze material powder is not particularly limited. However, the smaller the particle diameter of the non-frit glaze material, the better the results. More specifically, the 50% particle diameter of the non-frit glaze material is preferably not more than 6 µm, more preferably not more than 4 µm, particularly preferably not more than 1.5 µm.

According to a preferred embodiment of the present invention, in the glaze material (3), among the components constituting the glaze material powder, components, which remain as crystal grains at least after firing, have been subjected to size reduction to a 50% particle diameter of not more than 6 µm, more preferably not more than 4 µm. In this case, components, which remain as crystal grains at least after firing, among the components constituting the glaze material powder include particles of pigments, such as zircon, and silica (quartz) particles. The zircon particles remaining on the glaze surface after firing form dendriform covexes, and the silica particles remaining on the glaze surface after firing forms concaves. In this case, at the firing temperature (800 to 1300° C.), the zircon particles remain without dissolution as a solid solution in the vitreous component in the glaze. On the other hand, the silica particles are dissolved in the vitreous component in the glaze from the surface of the particles to form a solid solution . In this case, when the particles are coarse, the dissolution in the vitreous component to form a solid solution is unsatisfactory, and the particles remain without dissolution. Therefore, for particles of both the zircon and the silica, a smaller diameter of the particles can provide better results, because the irregularities are reduced.

Further, for the silica particles, fine particles of silica are preferred because they can contribute to improved alkali resistance and, during use for a long period of time, are less likely to cause an increase in surface roughness.

According to a preferred embodiment of the present invention, in the glaze material (3), when the non-frit glaze material has not been satisfactorily subjected to size reduction, for example, has a 50% particle diameter of about 6 µm, the content of the frit glaze material in the mixed glaze is preferably not more than 50% by weight, more preferably not more than 30% by weight. This can prevent gases evolved during firing from being stayed in the glaze layer and hence can prevent the occurrence of poor appearance.

In some cases, preferably, the amorphous glaze material such as the frit glaze material has a softening temperature above that of the non-frit glaze material powder. This also can prevent gases evolved during firing from being stayed in the glaze layer and hence can prevent the occurrence of poor appearance.

The glaze material may be applied to the sanitary ware body by any method without particular limitation, and a conventional method may be properly selected from spray coating, dip coating, spin coating, roll coating and the like.

The sanitary ware body with the precursor layer for a surface glaze layer being formed thereon is then fired. The firing temperature may vary depending upon whether or not the sanitary ware body has been previously sintered. When the ware body has not been previously sintered, firing is preferably carried out at a temperature of 1000° C. or above which causes sintering of the ware body and softening of the glaze. On the other hand, when the ware body has been previously sintered, firing is preferably carried out at a temperature of 300° C. or above, more preferably 400° C. or above, which can soften the glaze. The former method, that is, a method wherein, after a glaze material is coated onto the unsintered ware body, firing is carried out at a time, is preferred from the viewpoint of the production cost of the sanitary ware.

On the other hand, the latter method is advantageous in that the formation of a surface glaze layer on the completed sanitary ware can impart a new function.

The sanitary ware comprising an additional glaze layer between the sanitary ware body and the surface glaze layer may be produced in the same manner as described above, except that the step of forming a precursor layer for the glaze layer as the intermediate layer is added. Specifically, this sanitary ware may be produced in the same manner as described above, except that a precursor layer for the glaze layer as the intermediate layer, for example, a precursor for a color glaze layer is formed and a precursor for the surface glaze layer is formed thereon from any one of the glaze materials (1) to (3).

According to a preferred embodiment of the present invention, when the color glaze layer is formed between the sanitary ware body and the surface glaze layer, the D50 of the glaze material capable of forming the color glaze layer is preferably not less than 4 µm. A combination of the use of the color glaze material having such a particle diameter with the use of any one of the glaze materials (1) to (3) can prevent gases evolved during firing from being stayed in the glaze layer and hence can prevent the occurrence of poor appearance.

Sanitary Ware According to the Third Aspect of the Invention

The sanitary ware according to the third aspect of the present invention comprises: a sanitary ware body; and a surface glaze layer provided on the sanitary ware body, the surface of the surface glaze layer consisting essentially of a vitreous component and, in addition, being free from silica particles having a particle diameter of not less than 10 µm.

The sanitary ware according to the third aspect of the present invention possesses excellent alkali resistance, and, by virtue of the excellent alkali resistance, can effectively prevent deposition of stains or soils on the surface thereof and propagation of bacteria for a long period of time.

The present inventors have experimentally confirmed the following facts. The surface of the sanitary ware has hitherto been recognized as having a smooth surface as a result of satisfactory vitrification. Unlike this recognition, however, silica particles have remained on the surface of the sanitary ware without satisfactory vitrification. Further, it has been found that, after firing, these silica particles, together with the vitreous phase around the silica particles, create residual stress and application of some external force is likely to create cracking. Use of the sanitary ware having cracks under an environment of aqueous ammonia or under an environment of soapy water have increased cracks and caused dropouts of silica particles due to a dissolution reaction of the vitreous phase under the alkaline environment. It has been confirmed that the resultant cracks and the concaves formed by the dropouts of silica particles serve as hotbeds of bacteria or deposition sites of stains or soils and accelerate soiling of the sanitary ware and the washbowl. More specifically, toilets or urinals are always used in such an environment as will be exposed to urine. Urine is decomposed to ammonia through the action of urease, an enzyme possessed by bacteria present in toilet or urinal bowls. That is, the toilets and the urinals are always exposed to an ammoniacal alkaline environment and are used in such an environment as will cause expansion of cracks, created around silica particles, or dropouts of silica particles. On the other hand, the washbowls are used in such an environment that alkaline soapy water is splashed. This results in expansion of cracks, created around silica particles, or dropouts of silica particles.

The present inventors have now found that staining or soiling caused through the above mechanism which is the problem involved in the use of the sanitary ware under an alkaline environment can be satisfactorily prevented by controlling the surface of the surface glaze layer in such a manner that the surface consists essentially of a vitreous component and is free from silica particles having a diameter of not less than 10 µm.

According to a preferred embodiment of the present invention, the whole surface glaze layer consists essentially of a vitreous component and is free from silica particles having a diameter of not less than 10 µm.

As with the sanitary ware according to the first aspect of the present invention, the sanitary ware according to the third aspect of the present invention may be in the form of toilets, urinals, strainers for urinals, washbowls in washstands and the like.

The present inventors have found that a preferred formulation and a more preferred formulation of the glaze are as follows, although the effect of the present invention does not greatly depend upon the composition of the glaze.

| | Formulation, wt % | |
|---|---|---|
| | Preferred range | More preferred range |
| $SiO_2$: | 55 to 80 | 60 to 80 |
| $Al_2O_3$: | 5 to 13 | 5 to 10 |
| $Fe_2O_3$: | 0.1 to 0.4 | 0.1 to 0.4 |
| MgO: | 0.8 to 3.0 | 0.8 to 3.0 |
| CaO: | 8 to 17 | 8 to 15 |
| ZnO: | 3 to 8 | 4 to 8 |
| $K_2O$: | 1 to 4 | 1 to 4 |
| $Na_2O$: | 0.5 to 2.5 | 0.5 to 2.5 |
| $ZrO_2$: | 0.1 to 15 | 0.1 to 15 |
| pigment: | 1 to 20 | 1 to 20 |

According to a preferred embodiment of the present invention, an additional function can be imparted to the glaze layer by adding additives, other than the glaze, to the glaze layer. In this case, additives, which may be preferably added to the glaze, are such that they are reacted with the glaze or the atmosphere within the kiln during firing to form a compound. For example, antimicrobial effect can be provided, for example, by the addition of antimicrobial metals, such as silver, copper, zinc, or compounds and solid solutions thereof, and photocatalysts, such as titanium oxide, zinc oxide, tin oxide, ferric oxide, tungsten trioxide, strontium titanate, and dibismuth trioxide. Further, the presence of the photocatalyst can also offer photoreduction effect that can promote hydrophilification.

According to the present invention, the thickness of the surface glaze layer may be properly determined. For example, the thickness is generally about 0.1 to 3 mm, preferably about 0.2 to 2 mm, more preferably 0.3 to 1.2 mm.

According to a preferred embodiment of the present invention, the surface glaze layer is absent on a part of the surface of the sanitary ware according to the present invention. The sanitary ware according to the present invention is preferably produced by a production process described below. In this case, gases evolved during firing are released through portions not provided with the glaze layer. This can effectively prevent gases from being introduced into and stayed in the glaze layer, and hence can effectively prevent the occurrence of poor appearance. This embodiment is particularly advantageous when firing is carried out at a time after coating of a glaze material onto the sanitary ware body.

According to another embodiment of the present invention, a glaze layer is provided between the sanitary ware body and the surface glaze layer. In this case, the glaze layer may have a multi-layer structure so far as the surface of the surface glaze layer as the outermost layer is free from silica particles having a particle diameter of not less than 10 µm. More specifically, according to a preferred embodiment of the present invention, a color glaze layer is provided between the sanitary ware body and the surface glaze layer, and the surface glaze layer is transparent. According to this embodiment, the thickness of the surface glaze layer may be reduced, and even when the surface glaze layer has become very soft during firing, it is possible to effectively prevent such an unfavorable phenomenon that gases enter and are stayed in the glaze layer and consequently create poor appearance. Further, when zinc is contained as the glaze component, the zinc component is vaporized during firing, and deposited as zinc flowers within a kiln, resulting in contamination of the firing kiln. When the surface glaze layer is provided, however, zinc vaporized in the glaze layer as the intermediate layer cannot be introduced into the atmosphere within the kiln without passage through the surface glaze layer. Therefore, when the glaze layer is formed so as to have a two-layer structure with the total thickness of the two layers being equal to the thickness of the glaze layer formed in a single layer structure, the contamination of the kiln with zinc flowers can be more fully inhibited as compared with the provision of the glaze layer in a single layer structure, that is, the provision of the surface glaze layer alone as the glaze layer. Further, zinc is concentrated on the surface so that the concentration of zinc in the composition is gradually increased toward the surface, leading to an advantage that the antimicrobial activity is exhibited for a long period of time. Also according to this embodiment, as described above, preferably, the glaze layer is absent on a part of the sanitary ware.

In this case, the thickness of the surface glaze layer is generally 0.05 to 1.2 mm, preferably 0.1 to 0.8 mm, more preferably 0.15 to 0.4 mm. The thickness of the color glaze layer is generally 0.05 to 1.8 mm, preferably 0.1 to 1.2 mm, more preferably 0.2 to 0.7 mm.

Further, according to a preferred embodiment of the present invention, for the surface of the surface glaze layer in the sanitary ware according to the third aspect of the present invention, the center line average roughness Ra as defined in the first aspect of the present invention is preferably less than 0.07 $\mu$m, more preferably not more than 0.068 $\mu$m, still more preferably not more than 0.05 $\mu$m, most preferably not more than 0.03 $\mu$m. Ra falling within the above range can provide a sanitary ware onto which stains or soils are much less likely to be deposited.

According to a preferred embodiment of the present invention, the sanitary ware according to the third aspect of the present invention is preferably produced by the following production process.

At the outset, the sanitary ware body may be any conventional sanitary ware body which is prepared, for example, by properly shaping a slurry for a sanitary ware body obtained using quartz sand, feldspar, clay and the like as raw materials.

Utilization of a glaze having a 90% particle diameter of not more than 20 $\mu$m, preferably not more than 10 $\mu$m, or a glaze having a 50% particle diameter of not more than 5 $\mu$m is preferred as the glaze for the surface glaze layer. Use of a glaze with the particle diameter falling within the above range results in satisfactory vitrification of silica particles at a firing temperature of about 1300° C. or below, more specifically 1100 to 1300° C. and consequently can effectively prevent silica particles having a particle diameter of not less than 10 $\mu$m from being stayed on the surface. The glaze having the above particle diameter can be obtained by ball milling or beads milling of the glaze material.

According to another preferred embodiment of the present invention, the glaze is a mixed glaze prepared by mixing silica particles having a 90% particle diameter of not more than 15 $\mu$m, preferably not more than 10 $\mu$m, more preferably not more than 6 $\mu$m, or silica particles having a 50% particle diameter of not more than 5 $\mu$m, with a glaze material with the silica component removed therefrom. That is, preferably, the particle diameter of silica particles is controlled separately from other glaze materials.

Use of a glaze with the particle diameter falling within the above range results in satisfactory vitrification of silica particles at a firing temperature of about 1300° C. or below, more specifically 1100 to 1300° C. and consequently can effectively prevent silica particles having a particle diameter of not less than 10 $\mu$m from being stayed on the surface. Silica particles having the above diameter can be obtained, for example, by ball milling or beads milling of a naturally occurring quartz sand or a commercially available feldspar material.

According to a preferred embodiment of the present invention, the glaze is a mixed glaze comprised of an amorphous glaze material such as a frit glaze material and a non-frit glaze material. The frit glaze material can be obtained by melting a glaze material comprising quarts sand, feldspar, lime, clay, a pigment and the like at a high temperature of 1300° C. or above.

According to a further preferred embodiment of the present invention, the non-frit glaze material in the mixed glaze is a glaze having a 90% particle diameter of not more than 20 $\mu$m, preferably not more than 10 $\mu$m, or a glaze having a 50% particle diameter of not more than 5 $\mu$m.

The glaze material may be applied to the sanitary ware body by any method without particular limitation, and a conventional method may be properly selected from spray coating, dip coating, spin coating, roll coating and the like.

The sanitary ware body with the precursor layer for a surface glaze layer being formed thereon is then fired. The firing temperature may vary depending upon whether or not the sanitary ware body has been previously sintered. When the ware body has not been previously sintered, firing is preferably carried out at a temperature of 1000° C. to preferably 1300° C. which causes sintering of the ware body and softening of the glaze. On the other hand, when the ware body has been previously sintered, firing is preferably carried out at a temperature of 300° C. or above, more preferably 400° C. or above, which can soften the glaze. The former method, that is, a method wherein, after a glaze material is coated onto the unsintered ware body, firing is carried out at a time, is preferred from the viewpoint of the production cost of the sanitary ware.

On the other hand, the latter method is advantageous in that the formation of a surface glaze layer on the completed sanitary ware can impart a new function.

The sanitary ware comprising an additional glaze layer between the sanitary ware body and the surface glaze layer may be produced in the same manner as described above, except that the step of forming a precursor layer for the glaze layer as the intermediate layer is added. Specifically, this sanitary ware may be produced in the same manner as described above, except that a precursor layer for the glaze layer as the intermediate layer, for example, a precursor for a color glaze layer, is formed and a precursor for the surface glaze layer is formed thereon from the above glaze material.

Further, according to a preferred embodiment of the third aspect of the present invention, when the color glaze layer is formed between the sanitary ware body and the surface glaze layer, the glaze material is a mixed glaze composed of the non-frit glaze material and the frit glaze material. More preferably, the mixed glaze used is such that the non-frit glaze material has been subjected to size reduction to a 50% particle diameter of not more than 6 μm and is free from a pigment and/or an emulsifier (specifically $ZrO_2$). In this case, 50 to 99% by weight, preferably 60 to 95% by weight, of the mixed glaze is accounted for by the frit glaze material. Most preferably, the ratio of the non-frit glaze material to the fit glaze material is 30:70 to 10:90. In this case, the firing temperature is preferably 1300° C. or below, more specifically 800 to 1300° C. In summary, the preferred production process comprises the steps of: applying a color glaze material with a pigment and an emulsifier added thereto onto a sanitary ware body, further applying a mixed glaze, prepared by mixing a transparent non-frit glaze material containing neither a pigment nor an emulsifier with 50 to 99% by weight, preferably 60 to 90% by weight, of a frit glaze; and then conducting firing at a temperature of 1300° C. or below, more specifically 800 to 1300° C.

EXAMPLES

The present invention will be described in more detail with reference to the following examples, though it is not limited to these examples only.

Example A

Composition of Glaze

In the following Example A and Comparative Example A, material A for a glaze has the following composition.

$SiO_2$: 55 to 80 wt %
$Al_2O_3$: 5 to 13 wt %
$Fe_2O_3$: 0.1 to 0.4 wt %
MgO: 0.8 to 3.0 wt %
CaO: 8 to 17 wt %
ZnO: 3 to 8 wt %
$K_2O$: 1 to 4 wt %
$Na_2O$: 0.5 to 2.5 wt %
$ZrO_2$: 0.1 to 15 wt %
Pigment: 1 to 20 wt %

Testing Methods

In the following examples and comparative examples, evaluation tests were carried out by the following methods.

Test 1: Contact Angle with Water

The contact angle of the surface of the sample with water was measured with a contact angle goniometer (Model CA-X150, manufactured by Kyowa Interface Science Co., Ltd.). More specifically, a water droplet was dropped on the surface of the sample through a microsyringe and, 30 sec after that, the contact angle was measured with the contact angle goniometer.

Test 2: Removability of Smears

The inside of a portion having a size of 10 mmφ on the surface of the sample was blotted with an oil-based black marking ink (Magic Ink #700), followed by drying at room temperature for about one min. Thereafter, 3 ml of water was dropped on the sample, and the sample was then inspected on whether or not the Magic Ink was floated, and on whether or not the Magic Ink was washed away upon inclination of the sample.

Test 3: Removability of Oil Stains Under Water

A salad oil (0.01 g) was dropped on the surface of the sample. The whole sample was then submerged in a water tank, and the time taken for the salad oil deposited on the surface to be floated on the surface of water was measured.

Test 4: Deposition of Urinary Calculi

A plate specimen was installed on a trap portion of a stall urinal (U307C) manufactured by TOTO, LTD., and allowed to stand under ordinary service conditions for 7 days. Thereafter, the amount of urinary calculi deposited on the surface was visually evaluated.

Test 5: Deposition of Soap soils

A plate specimen was installed around a drainage port of a washstand provided with a liquid soap, and allowed to stand under ordinary service conditions for 7 days. Thereafter, the amount of soap soils deposited on the surface of the specimen was visually evaluated.

Example A1

The material A for a glaze (600 g), 400 g of water, and 1 kg of alumina balls were placed in a ceramic pot having a volume of 2 liters, and the mixture was then ball milled for about 65 hr to obtain a glaze. The particle diameter of the glaze thus obtained was measured with a laser diffraction particle size distribution analyzer. As a result, it was found that 98% of the particles were accounted for by particles having a diameter of not more than 10 μm and the 50% average particle diameter (D50) was 1.2 μm.

Next, a plate specimen having a size of 70×150 mm was prepared using a slurry for a sanitary ware body obtained using quartz sand, feldspar, clay and the like as raw materials. The glaze was spray coated onto the plate specimen, followed by firing at a temperature of 1300° C. or below, more specifically at 1100 to 1200° C., to obtain a sample.

For the sample thus obtained, the center line surface roughness Ra (JIS B 0601) was measured with a stylus type surface roughness tester (JIS B 0651), and found to be Ra=0.02 μm. Further, the surface roughness of 100×100 μm was measured by atomic force microscopy (AFM; Nano Scope III, manufactured by Digital Instruments), and found to be Ra=4.3 μm.

Figure 3:
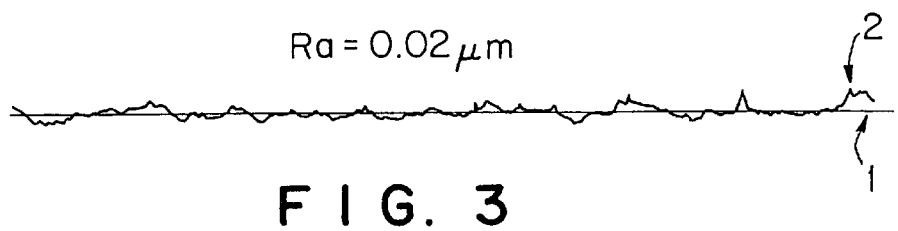
FIG. 3 is an enlarged diagram showing the state of the surface of earthenware in Example A1 as measured with a stylus type surface roughness tester (JIS B 0651), wherein numeral 1 designates a center line and numeral 2 the surface of a glaze layer.
Figure 8A:
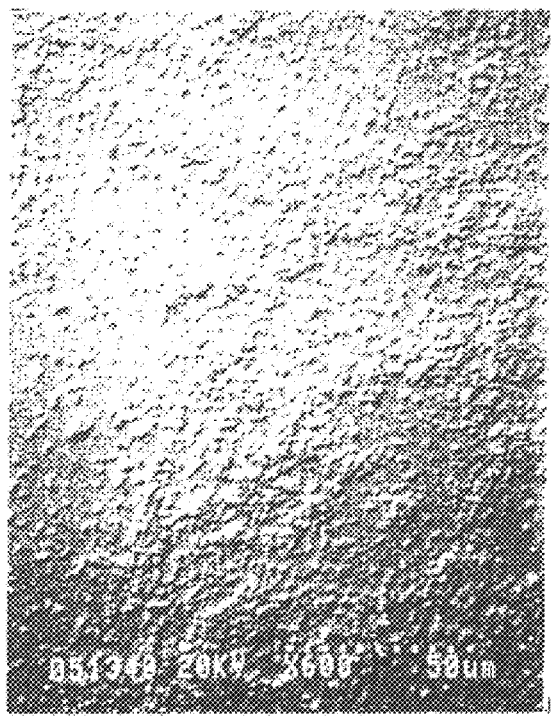
FIGS. 8(a) and 8(b) are a reflection electron photomicrographs of the surface of earthenware in Example A1 observed under a scanning electron microscope, wherein 8(*a*) shows an concave-convex image of the surface and 8(*b*) an image on the composition of the surface.
Figure 8B:
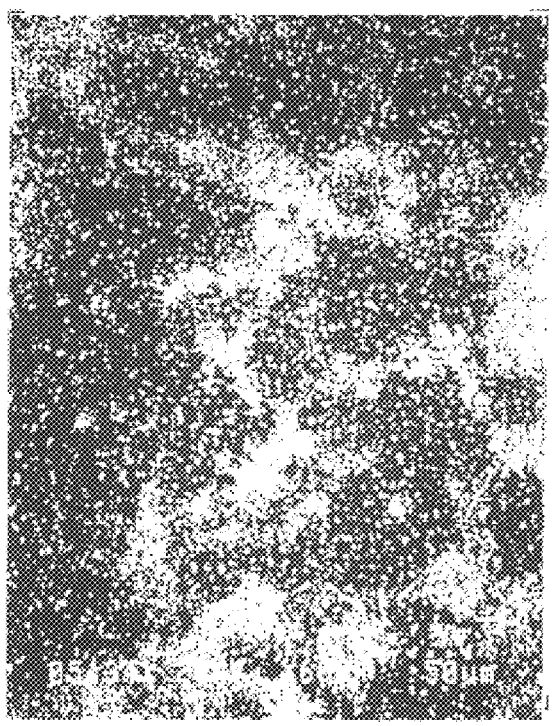

FIG. 3 shows an enlarged view of the surface obtained using the stylus type surface roughness tester. A concave-convex image of the surface utilizing a reflection electron image is shown in FIG. 8(a), and an image on the composition of the surface is shown in FIG. 8(b). Further, FIG. 11 is an enlarged view of the surface obtained by observation under an atomic force microscope (AFM).

For the sample, tests 1 to 5 described above were carried out. The results were as follows.

Test 1: The contact angle with water was 20°.

Test 2: About 30 sec after dropping of water, the Magic Ink was floated on the surface of water, and, upon inclination of the sample, the Magic Ink, together with water, was washed away to entirely remove the Magic Ink on the surface of the sample.

Test 3: 35 sec after submerging, the salad oil was floated on the surface of water.

Test 4: The amount of urinary calculi deposited was smaller than that in Comparative Example A1 described below, and a part of the deposited urinary calculi was washed out by running water.

Test 5: The amount of soap soil deposited was smaller than that in Comparative Example A1, and soap soil could be removed by rubbing with a water-containing sponge to expose the original surface of the glaze layer.

Example A2

A material was provided which had the same composition as the material A for a glaze except that the $ZrO_2$ component as the emulsifier and the pigment were removed from the composition of the material A for a glaze. This material (600 g), 400 g of water, and 1 kg of alumina balls were placed in a ceramic pot having a volume of 2 liters, and the mixture was then ball milled for about 65 hr to obtain a glaze. The particle diameter of the glaze thus obtained was measured with a laser diffraction particle size distribution analyzer. As a result, it was found that 98% of the particles were accounted for by particles having a diameter of not more than 10 µm and the 50% average particle diameter (D50) was 1.5 µm.

Next, the above glaze was spray coated onto the same plate specimen as used in Example A1, followed by firing at 1100 to 1200° C. to obtain a sample. The glaze layer in this sample was transparent.

For the sample thus obtained, the surface roughness was measured in the same manner as in Example A1, and found to be Ra=0.03 µm as measured by the stylus method and Ra=3.5 nm as measured by AFM.

FIG. 12 shows an enlarged view of the surface obtained by atomic force microscopy (AFM).

For the sample, tests 1 to 5 described above were carried out. The results were as follows.

Test 1: The contact angle with water was 15°.

Test 2: About 20 sec after dropping of water, the Magic Ink was floated on the surface of water, and, upon inclination of the sample, the Magic Ink, together with water, was washed away to entirely remove the Magic Ink on the surface of the sample.

Test 3: 15 sec after submerging, the salad oil was floated on the surface of water.

Test 4: The amount of urinary calculi deposited was smaller than that in Comparative Example A1 described below, and a part of the deposited urinary calculi was washed out by running water.

Test 5: The amount of soap soil deposited was smaller than that in Comparative Example A1 described below, and soap soil could be removed by rubbing with a water-containing sponge to expose the original surface of the glaze layer.

Example A3

The material A for a glaze was melted at 1300 to 1450° C. in an electric furnace, and the melt was then quenched in water to obtain a glass frit. The glass frit was then stamp milled. The powder thus obtained (600 g), 400 g of water, and 1 kg of alumina balls were placed in a ceramic pot having a volume of 2 liters, and the mixture was then ball milled for about 18 hr to obtain a frit glaze. The particle diameter of the frit glaze thus obtained was measured with a laser diffraction particle size distribution analyzer. As a result, it was found that 68% of the particles were accounted for by particles having a diameter of not more than 10 µm and the 50% average particle diameter (D50) was 6.0 µm.

Next, the above frit glaze was spray coated onto the same plate specimen as used in Example A1, followed by firing at 1100 to 1200° C. to obtain a sample.

For the sample thus obtained, the surface roughness was measured in the same manner as in Example A1, and found to be Ra=0.03 µm as measured by the stylus method and Ra=4.0 nm as measured by AFM.

Figure 4:
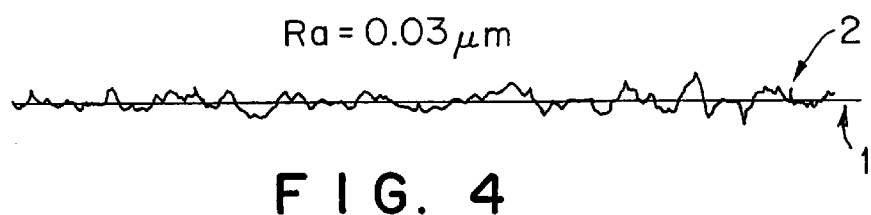
FIG. 4 is an enlarged diagram showing the state of the surface of earthenware in Example A3 as measured with a stylus type surface roughness tester (JIS B 0651), wherein numeral 1 designates a center line and numeral 2 the surface of a glaze layer.

FIG. 4 shows an enlarged view of the surface obtained using a stylus type surface roughness tester. FIG. 13 shows an enlarged view of the surface obtained by atomic force microscopy (AFM).

For the sample, tests 1 to 5 described above were carried out. The results were as follows.

Test 1: The contact angle with water was 20°.

Test 2: About 25 sec after dropping of water, the Magic Ink was floated on the surface of water, and, upon inclination of the sample, the Magic Ink, together with water, was washed away to entirely remove the Magic Ink on the surface of the sample.

Test 3: 20 sec after submerging, the salad oil was floated on the surface of water.

Test 4: The amount of urinary calculi deposited was smaller than that in Comparative Example A1 described below, and a part of the deposited urinary calculi was washed out by running water.

Test 5: The amount of soap soil deposited was smaller than that in Comparative Example A1 described below, and soap soil could be removed by rubbing with a water-containing sponge to expose the original surface of the glaze layer.

Example A4

The frit glaze (D50=12 µm) (70 parts by weight) obtained in Example A3 was mixed with 30 parts by weight of the ball milled frit (D50=1. 2 µm) obtained in Example A1 to obtain a mixed glaze. The particle diameter of the mixed glaze thus obtained was measured with a laser diffraction particle size distribution analyzer. As a result, it was found that 57% of the particles were accounted for by particles having a diameter of not more than 10 µm and the 50% average particle diameter (D50) was 6.3 µm.

Next, the above glaze was spray coated onto the same plate specimen as used in Example A1, followed by firing at 1100 to 1200° C. to obtain a sample.

For the sample thus obtained, the surface roughness was measured in the same manner as in Example A1, and found to be Ra=0.02 µm as measured by the stylus method and Ra=4.7 nm as measured by AFM.

Further, for the sample, tests 1 to 5 described above were carried out. The results were as follows.

Test 1: The contact angle with water was 20°.

Test 2: About 20 sec after dropping of water, the Magic Ink was floated on the surface of water, and, upon inclination of the sample, the Magic Ink, together with water, was washed away to entirely remove the Magic Ink on the surface of the sample.

Test 3: 20 sec after submerging, the salad oil was floated on the surface of water.

Test 4: The amount of urinary calculi deposited was smaller than that in Comparative Example A1 described below, and a part of the deposited urinary calculi was washed out by running water.

Test 5: The amount of soap soil deposited was smaller than that in Comparative Example A1 described below, and soap soil could be removed by rubbing with a water-containing sponge to expose the original surface of the glaze layer.

Example A5

A material A for a glaze (2 kg), 1 kg of water, and 4 kg of balls were placed in a ceramic pot having a volume of 6 liters, and the mixture was then ball milled for about 18 hr to obtain a glaze. The particle diameter of the glaze thus obtained was measured with a laser diffraction particle size distribution analyzer. As a result, it was found that 65% of the particles were accounted for by particles having a diameter of not more than 10 μm and the 50% average particle diameter (D50) was 6.2 μm.

Next, the above glaze was spray coated onto the same plate specimen as used in Example A1 to form a lower glaze layer, and the frit glaze prepared in Example A3 was then spray coated thereon to form an upper glaze layer, followed by firing at 1100 to 1200° C. to obtain a sample.

For the sample thus obtained, the surface roughness was measured in the same manner as in Example A1, and found to be Ra=0.03 μm as measured by the stylus method and Ra=3.8 nm as measured by AFM.

Figure 14:
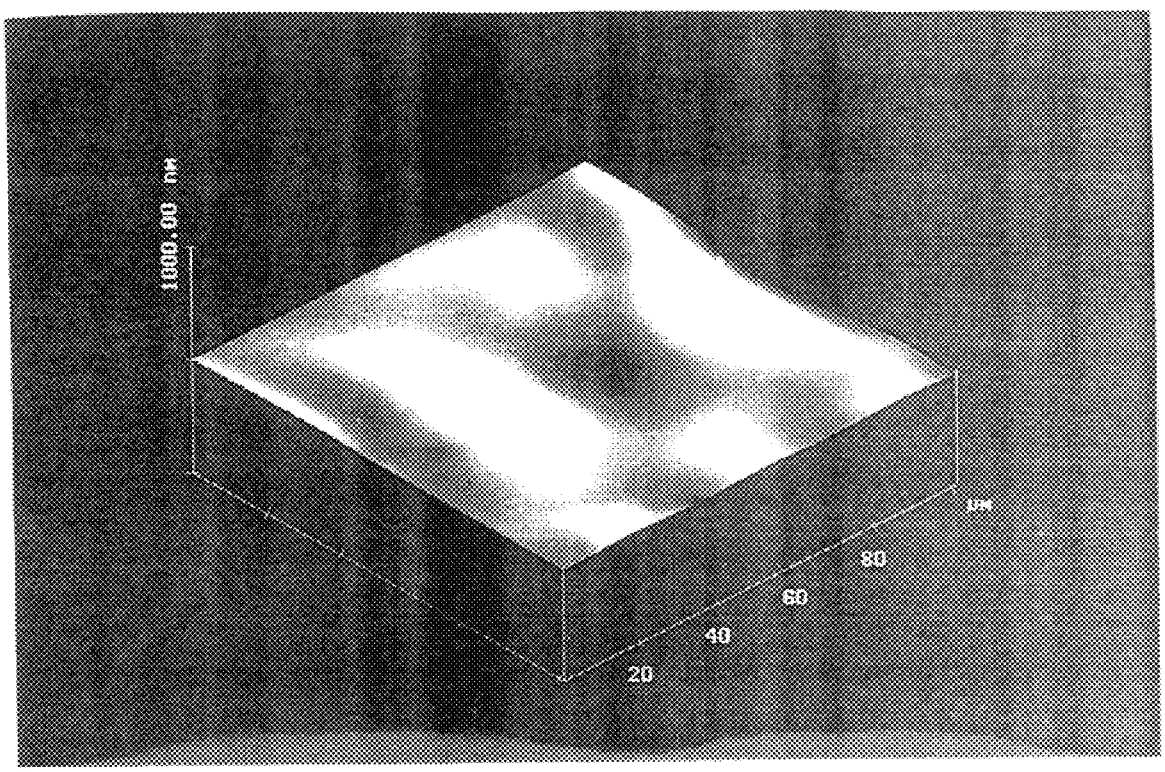
FIG. 14 is a diagram showing the state of the surface of earthenware in Example A5 obtained by observation under an atomic force microscope.

FIG. 14 shows an enlarged view of the surface obtained by atomic force microscopy (AFM).

Further, for the sample, tests 1 to 5 described above were carried out. The results were as follows.

Test 1: The contact angle with water was 20°.

Test 2: About 20 sec after dropping of water, the Magic Ink was floated on the surface of water, and, upon inclination of the sample, the Magic Ink, together with water, was washed away to entirely remove the Magic Ink on the surface of the sample.

Test 3: 20 sec after submerging, the salad oil was floated on the surface of water.

Test 4: The amount of urinary calculi deposited was smaller than that in Comparative Example A1 described below, and a part of the deposited urinary calculi was washed out by running water.

Test 5: The amount of soap soil deposited was smaller than that in Comparative Example A1 described below, and soap soil could be removed by rubbing with a water-containing sponge to expose the original surface of the glaze layer.

Example A6

A material was provided which had the same composition as the material A for a glaze except that the ZrO$_2$ and the pigment were removed from the composition of the material A. This material was melted at 1300 to 1450° C. in an electric furnace, and the melt was then quenched in water to obtain a glass frit. The glass frit was then stamp milled. The powder thus obtained (600 g), 400 g of water, and 1 kg of alumina balls were placed in a ceramic pot having a volume of 2 liters, and the mixture was then ball milled for about 18 hr to obtain a frit glaze. The particle diameter of the frit glaze thus obtained was measured with a laser diffraction particle size distribution analyzer. As a result, it was found that 68% of the particles were accounted for by particles having a diameter of not more than 10 μm and the 50% average particle diameter (D50) was 6.0 μm.

Next, the glaze prepared in Example A5 was spray coated onto the same plate specimen as used in Example A1 to form a lower glaze layer. Subsequently, the above frit glaze prepared was then spray coated thereon to form an upper glaze layer, followed by firing at 1100 to 1200° C. to obtain a sample.

Figure 5:
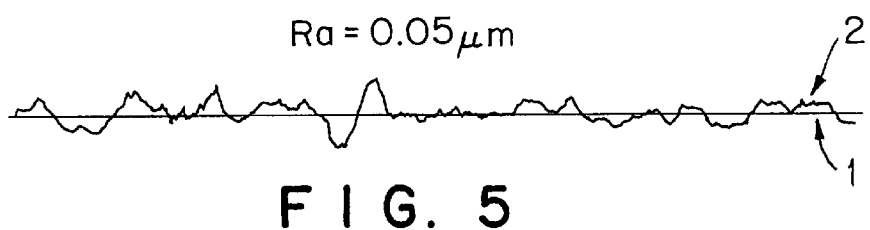
FIG. 5 is an enlarged diagram showing the state of the surface of earthenware in Example A6 as measured with a stylus type surface roughness tester (JIS B 0651), wherein numeral 1 designates a center line and numeral 2 the surface of a glaze layer.

For the sample thus obtained, the surface roughness was measured in the same manner as in Example A1, and found to be Ra=0.05 μm as measured by the stylus method. FIG. 5 shows an enlarged view of the surface obtained using a stylus type surface roughness tester.

Further, for the sample, tests 1 to 5 described above were carried out. The results were as follows.

Test 1: The contact angle with water was 16°.

Test 2: About 30 sec after dropping of water, the Magic Ink was floated on the surface of water, and, upon inclination of the sample, the Magic Ink, together with water, was washed away to entirely remove the Magic Ink on the surface of the sample.

Test 3: 25 sec after submerging, the salad oil was floated on the surface of water.

Test 4: The amount of urinary calculi deposited was smaller than that in Comparative Example A1 described below, and a part of the deposited urinary calculi was washed out by running water.

Test 5: The amount of soap soil deposited was smaller than that in Comparative Example A1 described below, and soap soil could be removed by rubbing with a water-containing sponge to expose the original surface of the glaze layer.

Example A7

The frit glaze (D50=6.0 μm) (80 parts by weight) obtained in Example A6 was mixed with 20 parts by weight of the glaze (D50=6.5 μm), free from the opacefier and the pigment, prepared in Example A2, to obtain a mixed glaze. The particle diameter of the mixed glaze thus obtained was measured with a laser diffraction particle size distribution analyzer. As a result, it was found that 57% of the particles were accounted for by particles having a diameter of not more than 10 μm and the 50% average particle diameter (D50) was 6.3 μm.

Next, the glaze prepared in Example A5 was spray coated onto the same plate specimen as used in Example A1 to form a lower glaze layer. Subsequently, the above mixed glaze was then spray coated thereon to form an upper glaze layer, followed by firing at 1100 to 1200° C. to obtain a sample.

Figure 6:
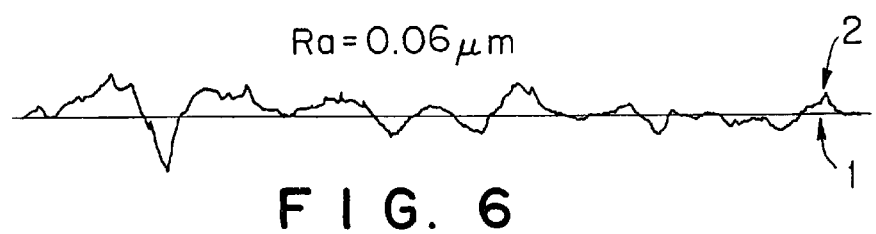
FIG. 6 is an enlarged diagram showing the state of the surface of earthenware in Example A7 as measured with a stylus type surface roughness tester (JIS B 0651), wherein numeral 1 designates a center line and numeral 2 the surface of a glaze layer.

For the sample thus obtained, the surface roughness was measured in the same manner as in Example A1, and found to be Ra=0.06 μm as measured by the stylus method. FIG. 6 shows an enlarged view of the surface obtained using a stylus type surface roughness tester.

Further, for the sample, tests 1 to 5 described above were carried out. The results were as follows.

Test 1: The contact angle with water was 19°.

Test 2: About 30 sec after dropping of water, the Magic Ink was floated on the surface of water, and, upon inclination of the sample, the Magic Ink, together with water, was washed away to entirely remove the Magic Ink on the surface of the sample.

Test 3: 30 sec after submerging, the salad oil was floated on the surface of water.

Test 4: The amount of urinary calculi deposited was smaller than that in Comparative Example A1 described below, and a part of the deposited urinary calculi was washed out by running water.

Test 5: The amount of soap soil deposited was smaller than that in Comparative Example A1 described below, and soap soil could be removed by rubbing with a water-containing sponge to expose the original surface of the glaze layer.

Comparative Example A1

The glaze prepared in Example A5 was spray coated onto the same plate specimen as used in Example A1, followed by firing at 1100 to 1200° C. to obtain a sample.

For the sample thus obtained, the surface roughness was measured in the same manner as in Example A1, and found to be Ra=0.10 μm as measured by the stylus method and Ra=18.0 nm as measured by AFM.

Figure 7A:
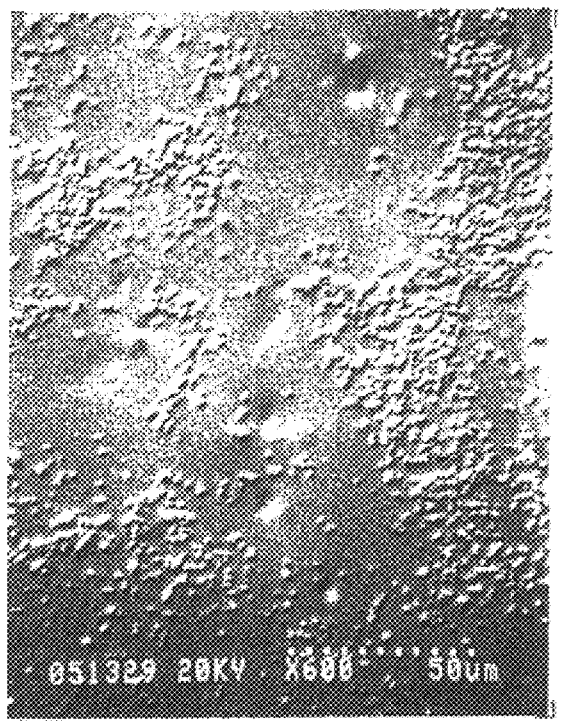
FIGS. 7(a) and 7(b) are reflection electron photomicrographs of the surface of earthenware in Comparative Example A1 observed under a scanning electron microscope, wherein 7(a) shows an concave-convex image of the surface and 7(b) an image on the composition of the surface.
Figure 7B:
Figure 9:
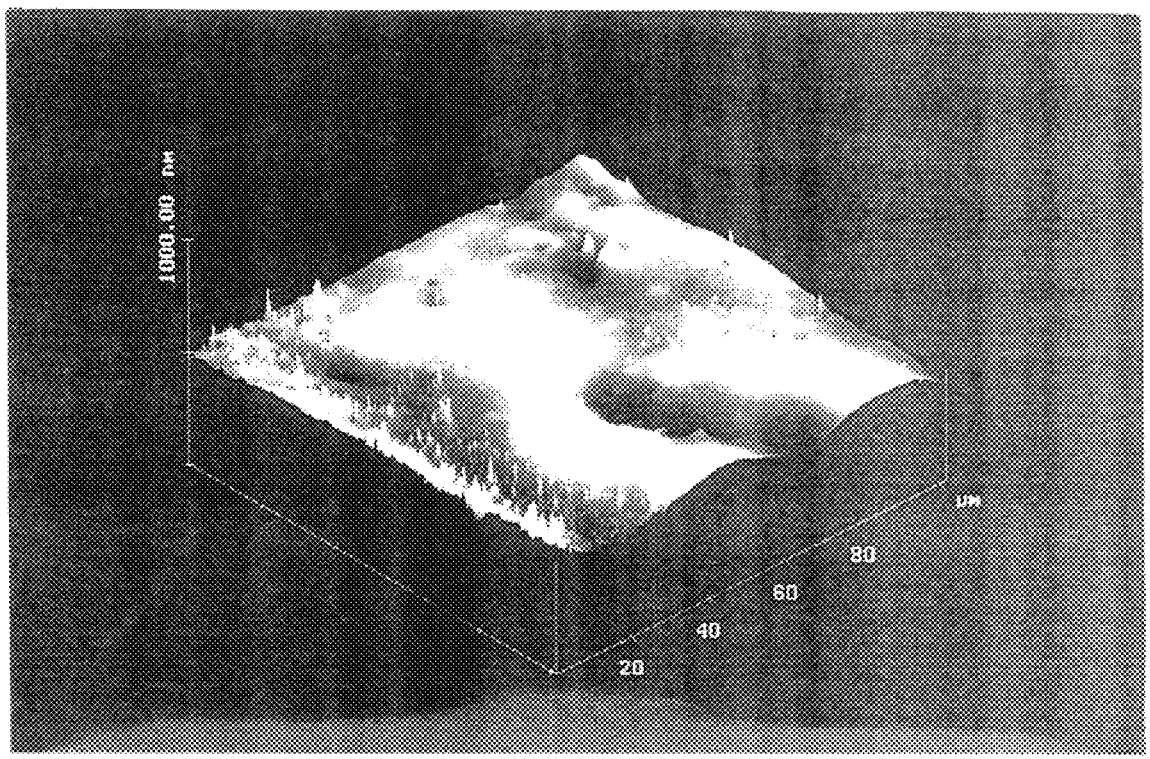
FIG. 9 is a diagram showing the state of the surface of earthenware in Comparative Example A1 obtained by observation under an atomic force microscope.

FIG. 1 shows an enlarged view of the surface obtained using a stylus type surface roughness tester. Further, a concavo-convex image and an image on the composition of the surface were observed under scanning electron microscope. The concave-convex image of the surface utilizing a reflection electron image is shown in FIG. 7(a), and the image on the composition of the surface is shown in FIG. 7(b). FIG. 9 is an enlarged view of the surface obtained by observation under an atomic force microscope (AFM).

For the sample, tests 1 to 5 described above were carried out. The results were as follows.

Test 1: The contact angle with water was 30°.

Test 2: The Magic Ink was not floated on the surface of water, and, when the sample was inclined, it remained on the surface of the sample.

Test 3: 50 sec after submerging, the salad oil was floated on the surface of water.

Test 4: A large amount of urinary calculi was deposited on the surface of the glaze layer of the specimen, and the deposited urinary calculi could not be removed by running water.

Test 5: Soap soil was deposited on substantially the whole surface of the glaze layer of the plate specimen, and it was very difficult to remove the soap soil even by rubbing the surface of the plate specimen with a water-containing sponge.

Comparative Example A2

For a commercially available Western-style toilet (color:ivory), the surface roughness was measured in the same manner as in Example A1, and found to be Ra=0.07 μm as measured by the stylus method and Ra=10.4 nm as measured by AFM.

Figure 2:
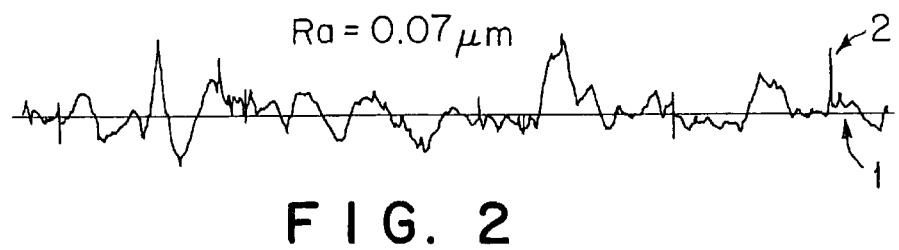
FIG. 2 is an enlarged diagram showing the state of the surface of earthenware in Comparative Example A2 as measured with a stylus type surface roughness tester (JIS B 0651), wherein numeral 1 designates a center line and numeral 2 the surface of a glaze layer.
Figure 10:
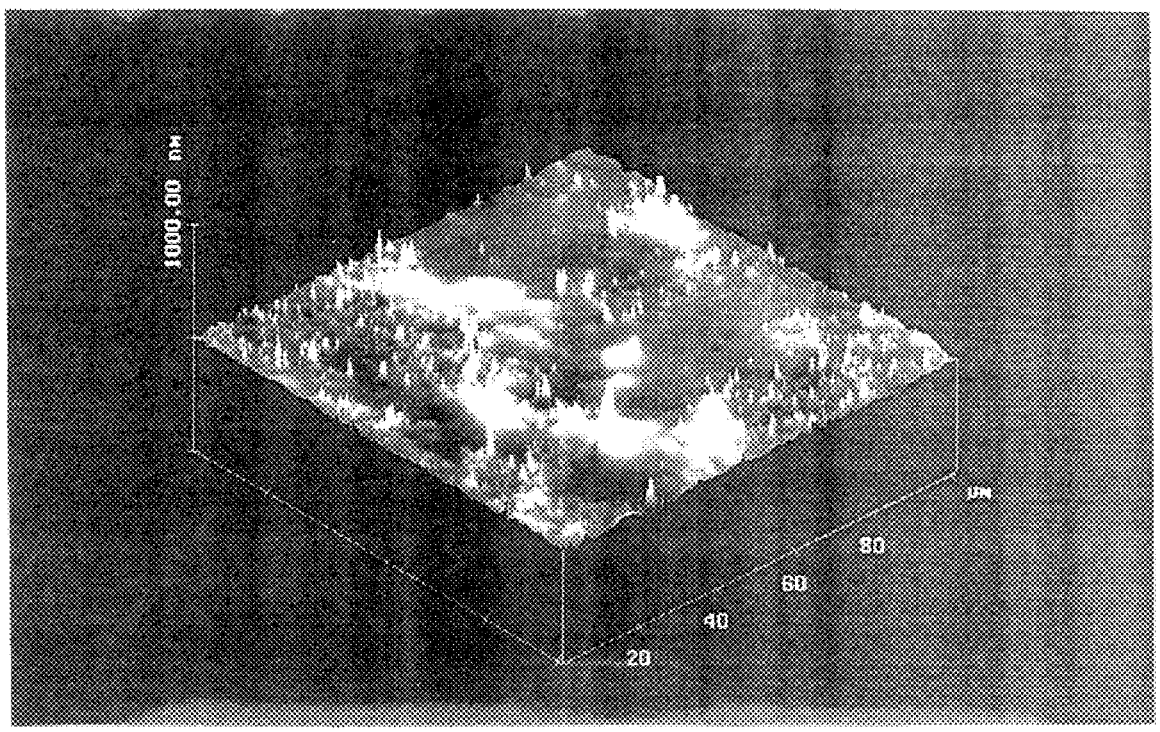
FIG. 10 is a diagram showing the state of the surface of earthenware in Comparative Example A2 obtained by observation under an atomic force microscope.

FIG. 2 shows an enlarged view of the surface obtained using a stylus type surface roughness tester. FIG. 10 is an enlarged view of the surface obtained by observation under an atomic force microscope (AFM).

For the commercially available toilet, tests 1 to 3 described above were carried out. The results were as follows.

Test 1: The contact angle with water was 50°.

Test 2: After dropping of water, the Magic Ink was not floated on the surface of water, and, when the sample was inclined, t remained on the surface of the sample.

Test 3: 120 sec after submerging, the salad oil was floated on the surface of water.

The results of Example A are summarized in the following Tables 1 and 2.

TABLE 1

| | Surface roughness Ra | | Contact angle |
|---|---|---|---|
| | Stylus type | AFM | ($H_2O$) |
| Ex. A1 | 0.02 μm | 4.3 nm | 20° |
| Ex. A2 | 0.03 μm | 3.5 nm | 15° |
| Ex. A3 | 0.03 μm | 4.0 nm | 20° |
| Ex. A4 | 0.02 μm | 4.7 nm | 20° |
| Ex. A5 | 0.03 μm | 3.8 nm | 20° |
| EX. A6 | 0.05 μm | — | 16° |
| Ex. A7 | 0.06 μm | — | 19° |
| Comp. Ex. A1 | 0.10 μm | 18.0 nm | 30° |
| Comp. Ex. A2 | 0.07 μm | 10.4 nm | 50° |

TABLE 2

| | Removability of Magic ™ ink | Time taken for salad oil to be floated on water | Amount of urinary calculi deposited on strainer in urinal | Amount of soap soils on washbowl |
|---|---|---|---|---|
| Ex. A1 | No ink left | 35 sec | Small | Small |
| Ex. A2 | No ink left | 15 sec | Small | Small |
| Ex. A3 | No jnk left | 20 sec | Small | Small |
| Ex. A4 | No ink left | 20 sec | Small | Small |
| Ex. A5 | No ink left | 20 sec | Small | Small |
| Ex. A6 | No ink left | 25 sec | Small | Small |
| Ex. A7 | No ink left | 30 sec | Small | Small |
| Comp. Ex. A1 | The whole ink left | 50 sec | Large | Large |
| Comp. Ex. A2 | The whole ink left | 120 sec | — | — |

Example B

Example B1

The material A for a glaze (600 g), 400 g of water, and 1 kg of alumina balls were placed in a ceramic pot having a volume of 2 liters, and the mixture was then ball milled for about 65 hr to obtain a glaze. The particle diameter of the glaze thus obtained was measured with a laser diffraction particle size distribution analyzer. As a result, it was found that 98% of the particles were accounted for by particles having a diameter of not more than 10 μm and the 50% average particle diameter (D50) was 1.2 μm.

Next, a plate specimen having a size of 70×150 mm was prepared using a slurry for a sanitary ware body obtained using quartz sand, feldspar, clay and the like as raw materials. The glaze was spray coated onto the plate specimen, followed by firing at 1100 to 1200° C. to obtain a sample. The color of the glaze in the sample thus obtained was pastel ivory (#SC1).

For the sample, the surface roughness and the glossiness were measured. The surface roughness was measured in terms of kurtosis Rku with a stylus type surface roughness tester (JIS B 0651), and found to be kurtosis Rku=2.00. The glossiness was measured in terms of specular glossiness at 60° Gs (60°) according to the method of measurement for specular glossiness (JIS Z 8741), and found to be Gs (60°)=102.0.

Example B2

The material A for a glaze was melted at 1300 to 1450° C. in an electric furnace, and the melt was then quenched in water to obtain a glass frit. The glass frit was then stamp milled. The powder thus obtained (600 g), 400 g of water, and 1 kg of alumina balls were placed in a ceramic pot having a volume of 2 liters, and the mixture was then ball milled for about 18 hr to obtain a frit glaze. The particle diameter of the frit glaze thus obtained was measured with a laser diffraction particle size distribution analyzer. As a result, it was found that 68% of the particles were accounted for by particles having a diameter of not more than 10 μm and the 50% average particle diameter (D50) was 6.0 μm.

Next, the above frit glaze was spray coated onto the same plate specimen as used in Example B1, followed by firing at 1100 to 1200° C. to obtain a sample. The color of the glaze in the sample thus obtained was pastel ivory (#SC1).

The sample thus obtained was evaluated in the same manner as in Example B1. As a result, the surface roughness in terms of kurtosis Rku was 1.90, and the specular glossiness at 60° Gs (60°) was 106.0.

Comparative Example B1

A material A for a glaze (2 kg), 1 kg of water, and 4 kg of balls were placed in a ceramic pot having a volume of 6 liters, and the mixture was then ball milled for about 18 hr to obtain a glaze. The particle diameter of the glaze thus obtained was measured with a laser diffraction particle size distribution analyzer. As a result, it was found that 65% of the particles were accounted for by particles having a diameter of not more than 10 μm and the 50% average particle diameter (D50) was 6.2 μm.

Next, the glaze was spray coated onto the same plate specimen as used in Example B1, followed by firing at 1100 to 1200° C. to obtain a sample.

The color of the glaze in the sample thus obtained was pastel ivory (#SC1).

The sample thus obtained was evaluated in the same manner as in Example B1. As a result, the surface roughness in terms of kurtosis Rku was 3.04, and the specular glossiness at 60° Gs (60°) was 95.0.

Comparative Example B2

For a commercially available Western-style toilet (color:ivory), the surface roughness in terms of kurtosis Rku and the specular glossiness at 60° Gs (60°)were measured in the same manner as in Example B1. As a result, the Rku was 2.70, and Gs (60°) was 98.0.

The results of Example B and Comparative Example B are summarized in FIG. 15. In the figure, A, B, C and D represent the results of Examples B1 and B2 and Comparative Examples B1 and B2, respectively. As is apparent from FIG. 15, the glossiness at 60° Gs (60°) increased with decreasing the surface roughness in terms of kurtosis Rku. That is, there is a negative correlation between the surface roughness and the glossiness. Further, bringing the Rku value to less than 2.70 can provide a glaze layer surface having a high glossiness Gs (60°) of not less than 100.

Example C

In the following Example C and Comparative Example C, evaluation tests were carried out by the following methods.

Alkali Resistance

A 5% aqueous sodium hydroxide solution was provided. Half of the specimen was immersed in the aqueous solution. The whole system was heated to 70° C., and allowed to stand at that temperature for 24 hr. Thereafter, the specimen was taken out of the aqueous solution and then washed with running water. In this case, the glaze surface before the immersion and the glaze surface after the immersion were observed under a scanning electron microscope (SEM; S-800, manufactured by Hitachi, Ltd.).

Surface Roughness

The surface roughness was measured with a stylus type surface roughness tester according to JIS B 0651 in the same manner as in Example A1.

Deposition of Urinary Calculi

Urine collected from a human being was diluted twice with distilled water. The diluted urine (about 2 liters) was placed in a toilet bowl, followed by sealing. In this state, the sealed toilet bowl was allowed to stand at room temperature for one week. In all the following examples and comparative examples, the pH value of the urine immediately after the dilution and the pH value of the urine after the standing in the toilet bowl for one week were measured at 25° C. with a pH meter (a pH meter M-12, manufactured by Horiba, Ltd.), and found to be 6.5 and 8.5, respectively.

The diluted urine within the bowl was disposed of. The inside of the bowl was washed with about 12 liters of running water (corresponding to the amount of water in washing using conventional flush tanks), and then dried at room temperature. Thereafter, the inside of the bowl was sprayed with a diluted solution of a bacterial plaque staining gel "DENTCLUB," manufactured by Health Tech Co., Ltd., and the amount of urine calculus deposited was evaluated based on the depth of red color. Use of the bacterial plaque staining gel permits a portion, where a large amount of urine calculi has been deposited, to be deeply stained red, while a portion free from urine calculi is not stained. The amount of urine calculi deposited can be visually evaluated through the utilization of this phenomenon.

Example C

The material A for a glaze was melted at 1400 to 1550° C. in an electric furnace, and the melt was then quenched in water to obtain a glass frit. The glass frit was then stamp milled. The powder thus obtained (250 g), 170 g of water, and 1 kg of balls were placed in a ceramic pot having a volume of 2 liters, and the mixture was then ball milled for about 18 hr to obtain a frit glaze.

Next, a plate specimen having a size of 70×150 mm was prepared using a slurry for a sanitary ware body obtained using quartz sand, feldspar, clay and the like as raw materials. The glaze was spray coated onto the plate specimen, followed by firing at 1100 to 1200° C. to obtain a sample.

The sample thus obtained was tested for alkali resistance. The glaze surface before the test was very smooth, and were free from silica particles. For the glaze surface after the alkali resistance test, there were dropouts of $ZrO_2$. Irregularities, however, were small, and the surface was smooth.

The surface roughness was Ra=0.02 μm before the alkali resistance test, and Ra=0.04 μm after the alkali resistance test.

A toilet bowl was prepared in the same manner as used in connection with the preparation of the sample described above. The toilet bowl thus obtained was tested for the deposition of urine calculi. The inside of the bowl was sprayed with a diluted solution of a bacterial plaque staining gel. As a result, a portion, which had drawn the diluted urine, and a portion, which had been immersed in the diluted urine, were lightly stained red. This depth of red was clearly smaller than that of red in Comparative Example C1 below, indicating that the amount of urine calculi deposited was smaller than that in Comparative Example C1.

Example C2

A material A for a glaze (2 kg), 1 kg of water, and 4 kg of balls were placed in a ceramic pot having a volume of 6 liters, and the mixture was then ball milled for about 18 hr to obtain a glaze. The particle diameter of the glaze thus obtained was measured with a laser diffraction particle size distribution analyzer. As a result, it was found that 65% of the particles were accounted for by particles having a diameter of not more than 10 μm, the 50% average particle diameter (D50) was 5.8 μm, and the 90% average particle diameter (D90) was 23.3 μm.

Separately, a glaze material was provided which had the same composition as the material A for a glaze except that $ZrO_2$ as the emulsifier and the pigment were removed from the composition of the material A. This material was melted at 1400 to 1550° C. in an electric furnace, and the melt was then quenched in water to obtain a glass frit. The glass frit was then stamp milled. The powder thus obtained (250 g), 170 g of water, and 1 kg of balls were placed in a ceramic pot having a volume of 2 liters, and the mixture was then ball milled for about 18 hr to obtain a transparent frit glaze.

Next, the glaze was spray coated onto the same plate specimen as used in Example C1, and the transparent frit glaze was then spray coated thereon, followed by firing at 1100 to 1200° C. to obtain a sample.

The sample thus obtained was tested for alkali resistance. The glaze surface before the test and the glaze surface after the test were observed under a scanning electron microscope (SEM; S-800, manufactured by Hitachi, Ltd.). An SEM photograph of the glaze surface before the test and an SEM photograph of the glaze surface after the test are shown in FIGS. 18 and 19, respectively. These photographs show that the glaze surface before the alkali resistance test is very smooth and free from silica particles and that the glaze surface after the alkali resistance test remains substantially unchanged and is smooth.

The surface roughness was Ra=0.02 μm before the alkali resistance test, and Ra=0.03 μm after the alkali resistance test.

A toilet bowl was prepared in the same manner as used in connection with the preparation of the sample described above. The toilet bowl thus obtained was tested for the deposition of urine calculi. The inside of the bowl was sprayed with a diluted solution of a bacterial plaque staining gel. As a result, a portion, which had drawn the diluted urine, and a portion, which had been immersed in the diluted urine, were lightly stained red. This depth of red was clearly smaller than that of red in Comparative Example C2 below, indicating that the amount of urine calculi deposited was smaller than that in Comparative Example C2.

Example C3

The material A for a glaze (2 kg), 1 kg of water, and 4 kg of alumina balls were placed in a ceramic pot having a volume of 6 liters, and the mixture was then ball milled for about 36 hr to obtain a glaze. The particle diameter of the glaze thus obtained was measured with a laser diffraction particle size distribution analyzer. As a result, it was found that 90% of the particles were accounted for by particles having a diameter of not more than 10 μm, the 50% average particle diameter (D50) was 3.3 μm, and the 90% average particle diameter (D90) was 9.9 μm.

Next, the glaze was spray coated onto the same plate specimen as used in Example C1, followed by firing at 1100 to 1200° C. to obtain a sample.

The sample thus obtained was tested for alkali resistance. As compared with the sample prepared in Comparative Example C1 below, the glaze surface before the test was smaller in amount and size of silica particles, was free from silica particles having a size of not less than 10 μm, and was very smooth. The glaze surface after the alkali resistance test was very small in the number of cracks, and was smooth.

The surface roughness was Ra=0.03 μm before the alkali resistance test, and Ra=0.10 μm after the alkali resistance test.

A toilet bowl was prepared in the same manner as used in connection with the preparation of the sample described above. The toilet bowl thus obtained was tested for the deposition of urine calculi. The inside of the bowl was sprayed with a diluted solution of a bacterial plaque staining gel. As a result, a portion, which had drawn the diluted urine, and a portion, which had been immersed in the diluted urine, were lightly stained red. This depth of red was clearly smaller than that of red in Comparative Example C1 below, indicating that the amount of urine calculi deposited was smaller than that in Comparative Example C1.

Example C4

The material A for a glaze (2 kg), 1 kg of water, and 4 kg of balls were placed in a ceramic pot having a volume of 6 liters, and the mixture was then ball milled for about 18 hr to obtain a glaze. The particle diameter of the glaze thus obtained was measured with a laser diffraction particle size distribution analyzer. As a result, it was found that 65% of the particles were accounted for by particles having a diameter of not more than 10 μm, the 50% average particle diameter (D50) was 5.8 μm, and the 90% average particle diameter (D90) was 23.3 μm.

Separately, a material was provided which had the same composition as the material A for a glaze except that $ZrO_2$ as the emulsifier and the pigment were removed from the composition of the material A. This material (2 kg), 1 kg of water, and 4 kg of alumina balls were placed in a ceramic pot having a volume of 6 liters, and the mixture was then ball milled for about 60 hr to obtain a milled transparent glaze. For the milled transparent glaze, 100% of the particles were accounted for by particles having a diameter of not more than 10 μm, the D50 value was 1.7 μm, and the D90 value was 3.8 μm.

Next, the glaze was spray coated onto the same plate specimen as used in Example C1, and the milled transparent glaze was then spray coated thereon, followed by firing at 1100 to 1200° C. to obtain a sample.

The sample thus obtained was tested for alkali resistance. The glaze surface before the test was very smooth and free from silica particles. The glaze surface after the alkali resistance test remained substantially unchanged and was smooth.

The surface roughness was Ra=0.03 μm before the alkali resistance test, and Ra=0.04 μm after the alkali resistance test.

A toilet bowl was prepared in the same manner as used in connection with the preparation of the sample described above. The toilet bowl thus obtained was tested for the deposition of urine calculi. The inside of the bowl was sprayed with a diluted solution of a bacterial plaque staining gel. As a result, a portion, which had drawn the diluted urine, and a portion, which had been immersed in the diluted urine, were lightly stained red. This depth of red was clearly smaller than that of red in Comparative Example C2 below, indicating that the amount of urine calculi deposited was smaller than that in Comparative Example C2.

Example C5

The material was provided which had the same composition as the material A for a glaze except that quartz sand as the raw material of silica particles and the commercially available feldspar material were removed from the composition of the material A. This material (2 kg), 1 kg of water, and 4 kg of alumina balls were placed in a ceramic pot having a volume of 6 liters, and the mixture was then ball milled for about 18 hr to obtain a glaze. The particle diameter of the glaze thus obtained was measured with a laser diffraction particle size distribution analyzer. As a result, it was found that 99% of the particles were accounted for by particles having a diameter of not more than 10 μm, the 50% average particle diameter (D50) was 2.2 μm, and the 90% average particle diameter (D90) was 5.1 μm.

Separately, 400 g of quartz sand, 200 g of commercially available feldspar material, 300 g of water, and 1.2 kg of alumina balls were placed in a ceramic pot having a volume of 6 liters, and the mixture was then ball milled for about 40 hr to obtain a silica slurry. For the silica slurry, 98% of the particles were accounted for by particles having a diameter of not more than 10 μm, the D50 value was 2.4 μm, and the D90 value was 5.5 μm.

The glaze and the silica slurry were mixed together in a weight ratio of 4:6 to obtain a mixed glaze. For the mixture glaze, 99% of the particles were accounted for by particles having a diameter of not more than 10 μm, the D50 value was 2.3 μm, and the D90 value was 5.3 μm.

Next, the mixed glaze was spray coated onto the same plate specimen as used in Example C1, followed by firing at 1100 to 1200° C. to obtain a sample.

The sample thus obtained was tested for alkali resistance. The glaze surface before the test was very smooth and free from silica particles having a size of more than 10 μm. The glaze surface after the alkali resistance test remained substantially unchanged and was smooth, although a very small amount of cracked silica particles having a size of not more than 10 μm were present.

The surface roughness was Ra=0.04 μm before the alkali resistance test, and Ra=0.11 μm after the alkali resistance test.

A toilet bowl was prepared in the same manner as used in connection with the preparation of the sample described above. The toilet bowl thus obtained was tested for the deposition of urine calculi. The inside of the bowl was sprayed with a diluted solution of a bacterial plaque staining gel. As a result, a portion, which had drawn the diluted urine, and a portion, which had been immersed in the diluted urine, were lightly stained red. This depth of red was clearly smaller than that of red in Comparative Example C1 below, indicating that the amount of urine calculi deposited was smaller than that in Comparative Example C1.

Example C6

The material A for a glaze (2 kg), 1 kg of water, and 4 kg of balls were placed in a ceramic pot having a volume of 6 liters, and the mixture was then ball milled for about 18 hr to obtain a glaze. The particle diameter of the ball milled glaze thus obtained was measured with a laser diffraction particle size distribution analyzer. As a result, it was found that 65% of the particles were accounted for by particles having a diameter of not more than 10 μm, the 50% average particle diameter (D50) was 5.8 μm, and the 90% average particle diameter (D90) was 23.3 μm.

Separately, a glaze material was provided which had the same composition as the material A for a glaze except that $ZrO_2$ as the emulsifier, the pigment, the quartz sand as the raw material for silica particles, and the commercially available feldspar material were removed from the composition of the material A. This material (2 kg), 1 kg of water, and 4 kg of alumina balls were placed in a ceramic pot having a volume of 6 liters, and the mixture was then ball milled for about 18 hr to obtain a transparent glaze. For the transparent glaze, 97% of the particles were accounted for by particles having a diameter of not more than 10 μm, the D50 value was 2.3 μm, and the D90 value was 5.0 μm.

Further, separately, 400 g of quartz sand, 200 g of feldspar, 300 g of water, and 1.2 kg of alumina balls were placed in a ceramic pot having a volume of 6 liters, and the mixture was then ball milled for about 40 hr to obtain a silica slurry. For the silica slurry, 98% of the particles were accounted for by particles having a diameter of not more than 10 μm, the D50 value was 2.4 μm, and the D90 value was 5.5 μm.

The transparent glaze and the silica slurry were mixed together in a weight ratio of 4:6 to obtain a transparent mixed glaze. For the transparent mixed glaze, 98% of the particles were accounted for by particles having a diameter of not more than 10 μm, the D50 value was 2.4 μm, and the D90 value was 5.3 μm.

Next, the glaze was spray coated onto the same plate specimen as used in Example C1, and the transparent mixed glaze was then spray coated thereon, followed by firing at 1100 to 1200° C. to obtain a sample.

The sample thus obtained was tested for alkali resistance. The glaze surface before the test was very smooth and free from silica particles having a size of more than 10 μm. The glaze surface after the alkali resistance test remained substantially unchanged from the state before the test and was smooth, although a very small amount of cracked silica particles having a size of not more than 10 μm were present.

The surface roughness was Ra=0.04 μm before the alkali resistance test, and Ra=0.05 μm after the alkali resistance test.

A toilet bowl was prepared in the same manner as used in connection with the preparation of the sample described above. The toilet bowl thus obtained was tested for the deposition of urine calculi. The inside of the bowl was sprayed with a diluted solution of a bacterial plaque staining gel. As a result, a portion, which had drawn the diluted urine, and a portion, which had been immersed in the diluted urine, were lightly stained red. This depth of red was clearly smaller than that of red in Comparative Example C2 below, indicating that the amount of urine calculi deposited was smaller than that in Comparative Example C2.

Example C7

The material A for a glaze was melted at 1400 to 1550° C. in an electric furnace, and the melt was then quenched in water to obtain a glass frit. The glass frit was then stamp milled. The powder thus obtained (250 g), 170 g of water, and 1 kg of balls were placed in a ceramic pot having a volume of 2 liters, and the mixture was then ball milled for about 18 hr to obtain a frit glaze.

Separately, 2 kg of the material A for a glaze, 1 kg of water, and 4 kg of alumina balls were placed in a ceramic pot having a volume of 6 liters, and the mixture was then ball milled for about 36 hr to obtain a milled glaze. For the milled glaze, 90% of the particles were accounted for by particles having a diameter of not more than 10 $\mu$m, the D50 value was 3.3 $\mu$m, and the D90 value was 9.9 $\mu$m.

The frit glaze and the milled glaze were mixed together in a weight ratio of 8:2 to obtain a mixed glaze. For the mixed glaze, 76% of the particles were accounted for by particles having a diameter of not more than 10 $\mu$m, the D50 value was 4.0 $\mu$m, and the D90 value was 15.9 $\mu$m.

Next, the mixed glaze was spray coated onto the same plate specimen as used in Example C1, followed by firing at 1100 to 1200° C. to obtain a sample.

The sample thus obtained was tested for alkali resistance. The glaze surface before the test was very smooth and free from silica particles having a size of more than 10 $\mu$m. As compared with the sample prepared in Comparative Example C1 below, the glaze surface before the test was smaller in the number and size of silica particles. The glaze surface after the alkali resistance test was small in the number of cracks created around silica particles, remained substantially unchanged from the glaze surface before the test, and was smooth.

The surface roughness was Ra=0.05 $\mu$m before the alkali resistance test, and Ra=0.10 $\mu$m after the alkali resistance test.

A toilet bowl was prepared in the same manner as used in connection with the preparation of the sample described above. The toilet bowl thus obtained was tested for the deposition of urine calculi. The inside of the bowl was sprayed with a diluted solution of a bacterial plaque staining gel. As a result, a portion, which had drawn the diluted urine, and a portion, which had been immersed in the diluted urine, were lightly stained red. This depth of red was clearly smaller than that of red in Comparative Example C1 below, indicating that the amount of urine calculi deposited was smaller than that in Comparative Example C1.

Example C8

The material A for a glaze (2 kg), 1 kg of water, and 4 kg of balls were placed in a ceramic pot having a volume of 6 liters, and the mixture was then ball milled for about 18 hr to obtain a glaze. The particle diameter of the glaze obtained after the ball milling was measured with a laser diffraction particle size distribution analyzer. As a result, it was found that 65% of the particles were accounted for by particles having a diameter of not more than 10 $\mu$m, the 50% average particle diameter (D50) was 5.8 $\mu$m, and the 90% average particle diameter (D90) was 23.3 $\mu$m.

Separately, a glaze material for a glaze was provided which had the same composition as the material A for a glaze except that $ZrO_2$ as the emulsifier and the pigment were removed from the composition of the material A. This material was melted at 1400 to 1550° C. in an electric furnace, and the melt was then quenched in water to obtain a glass frit. The glass frit was then stamp milled. The powder thus obtained (1.6 kg), 0.4 kg of a material for a glaze having the same composition as the material A for a glaze except that $ZrO_2$ as the emulsifier and the pigment were removed from the composition of the material A, 1 kg of water, and 4 kg of balls were placed in a ceramic pot having a volume of 6 liters, and the mixture was then ball milled for about 36 hr to obtain a transparent mixed glaze.

Next, the glaze was spray coated onto the same plate specimen as used in Example C1, and the transparent mixed glaze was spray coated thereon, followed by firing at 1100 to 1200° C. to obtain a sample.

The sample thus obtained was tested for alkali resistance. The glaze surface before the test was very smooth and free from silica particles having a size of more than 10 $\mu$m. As compared with the sample prepared in Comparative Example C2 below, the glaze surface before the test was smaller in the number and size of silica particles. The glaze surface after the alkali resistance test was small in the number of cracks created around silica particles, remained substantially unchanged from the glaze surface before the test, and was smooth.

The surface roughness was Ra=0.04 $\mu$m before the alkali resistance test, and Ra=0.06 $\mu$m after the alkali resistance test.

A toilet bowl was prepared in the same manner as used in connection with the preparation of the sample described above. The toilet bowl thus obtained was tested for the deposition of urine calculi. The inside of the bowl was sprayed with a diluted solution of a bacterial plaque staining gel. As a result, a portion, which had drawn the diluted urine, and a portion, which had been immersed in the diluted urine, were lightly stained red. This depth of red was clearly smaller than that of red in Comparative Example C2 below, indicating that the amount of urine calculi deposited was smaller than that in Comparative Example C2.

Comparative Example C1

The material A for a glaze (2 kg), 1 kg of water, and 4 kg of balls were placed in a ceramic pot having a volume of 6 liters, and the mixture was then ball milled for about 18 hr to obtain a glaze. The particle diameter of the glaze obtained after the ball milling was measured with a laser diffraction particle size distribution analyzer. As a result, it was found that 65% of the particles were accounted for by particles having a diameter of not more than 10 $\mu$m, the 50% average particle diameter (D50) was 5.8 $\mu$m, and the 90% average particle diameter (D90) was 23.3 $\mu$m.

Separately, 1.2 kg of quartz sand incorporated as an $SiO_2$ source into the material A for a glaze and 0.8 kg of a commercially available feldspar material, together with 1 kg of water and 4 kg of balls, were placed in a ceramic pot having a volume of 6 liters, and the mixture was then ball milled for about 18 hr. For the ball milled product, the D50 value was 9.3 $\mu$m. This suggests that the quartz sand and the commercially available feldspar material in the glaze have been milled to a D50 value around 10 $\mu$m.

Next, the glaze was spray coated onto the same plate specimen as used in Example C1, followed by firing at 1100 to 1200° C. to obtain a sample.

The sample thus obtained was tested for alkali resistance. The glaze surface before the test and the glaze surface after the test were observed under a scanning electron microscope (SEM; S-800, manufactured by Hitachi, Ltd.). The glaze surface before the alkali resistance test had concaves due to the presence of a large number of silica particles. For the glaze surface after the alkali resistance test, cracks were created around the silica particles, and there were dropouts of the silica particles, resulting in increased size of irregularities.

The surface roughness was Ra=0.10 μm before the alkali resistance test, and Ra=0.25 μm after the alkali resistance test.

A toilet bowl was prepared in the same manner as used in connection with the preparation of the sample described above. The toilet bowl thus obtained was tested for the deposition of urine calculi. The inside of the bowl was sprayed with a diluted solution of a bacterial plaque staining gel. As a result, a portion, which had drawn the diluted urine, and a portion, which had been immersed in the diluted urine, within the bowl were deeply stained red, indicating that a large amount of urine calculi was deposited.

Comparative Example C2

The material A for a glaze (2 kg), 1 kg of water, and 4 kg of balls were placed in a ceramic pot having a volume of 6 liters, and the mixture was then ball milled for about 18 hr to obtain a glaze. The particle diameter of the glaze obtained after the ball milling was measured with a laser diffraction particle size distribution analyzer. As a result, it was found that 65% of the particles were accounted for by particles having a diameter of not more than 10 μm, the 50% average particle diameter (D50) was 5.8 μm, and the 90% average particle diameter (D90) was 23.3 μm.

Separately, a material was provided which had the same composition as the material A for a glaze except that $ZrO_2$ as the emulsifier and the pigment were removed from the composition of the material A. This material (2 kg), 1 kg of water, and 4 kg of balls were placed in a ceramic pot having a volume of 6 liters, and the mixture was then ball milled for about 18 hr to obtain a transparent glaze. For the transparent glaze, 63% of the particles were accounted for by particles having a diameter of not more than 10 μm, the D50 value was 6.0 μm, and the D90 value was 25.4 μm.

Next, the glaze was spray coated onto the same plate specimen as used in Example C1, and the transparent glaze was then spray coated thereon, followed by firing at 1100 to 1200° C. to obtain a sample.

The sample thus obtained was tested for alkali resistance. An SEM photograph of the glaze surface before the test and an SEM photograph of the glaze surface after the test are shown in FIGS. 16 and 17, respectively. As can be seen from these photographs, the glaze surface before the alkali resistance test had concaves attributable to the presence of a large number of silica particles (deeply dark portion). For the glaze surface after the alkali resistance test, cracks were created around the silica particles, and there were dropouts of the silica particles, resulting in increased size of irregularities.

The surface roughness was Ra=0.08 μm before the alkali resistance test, and Ra=0.10 μm after the alkali resistance test.

A toilet bowl was prepared in the same manner as used in connection with the preparation of the sample described above. The toilet bowl thus obtained was tested for the deposition of urine calculi. The inside of the bowl was sprayed with a diluted solution of a bacterial plaque staining gel. As a result, a portion, which had drawn the diluted urine, and a portion, which had been immersed in the diluted urine, within the bowl were deeply stained red, indicating that a large amount of urine calculi was deposited.

Example D

Examples D1 to D6 and Comparative Examples D1 to D5

The material A for a glaze (2 kg), 1 kg of water, and 4 kg of balls were placed in a ceramic pot having a volume of 6 liters, and the mixture was then ball milled for about 18 hr to obtain a color glaze. The particle diameter of the color glaze thus obtained was measured with a laser diffraction particle size distribution analyzer. As a result, it was found that 65% of the particles were accounted for by particles having a diameter of not more than 10 μm and the 50% average particle diameter (D50) was 5.8 μm.

Separately, a material for a glaze was provided which had the same composition as the material A for a glaze except that $ZrO_2$ as the emulsifier and the pigment were removed from the composition of the material A. This material was melted at 1300 to 1500° C. in an electric furnace, and the melt was then quenched in water to obtain a glass frit. A material for a glaze having the same composition as the material A for a glaze except that $ZrO_2$ as the emulsifier and the pigment were removed from the composition of the material A, the frit glaze, water, and balls were placed in a ceramic pot, and the mixture was ball milled until 64±2% of the particles were accounted for by particles having a diameter of not more than 10 μm. Thus, a transparent mixed glaze was obtained. The mixing ratio of the material for a glaze to the frit glaze in the transparent mixed glaze were as indicated in the following table.

Next, a plate specimen having a size of 70×150 mm was prepared using a slurry for a sanitary ware body obtained using quartz sand, feldspar, clay and the like as raw materials. The color glaze was spray coated onto the plate specimen, and the transparent mixed glaze was spray coated thereon, followed by firing at 1100 to 1200° C. to obtain a sample.

Figure 22:
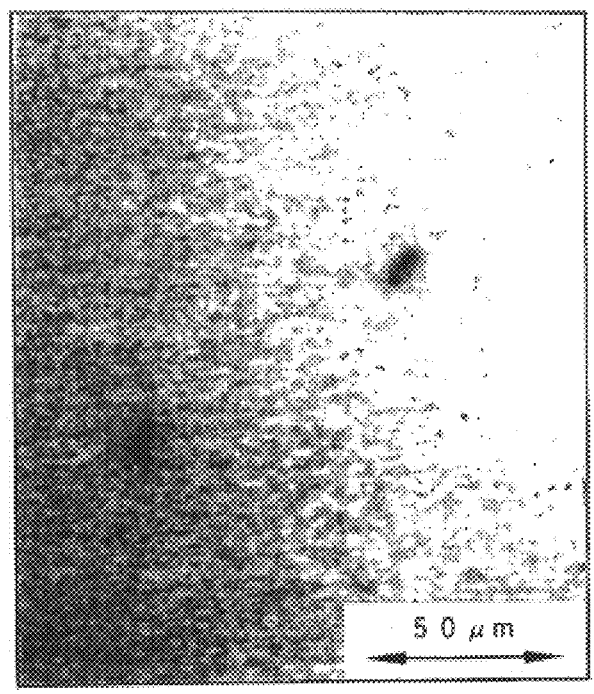
FIG. 22 is a reflection electron image of the glaze surface before an alkali resistance test in Example D1 observed under a scanning electron microscope.
Figure 23:
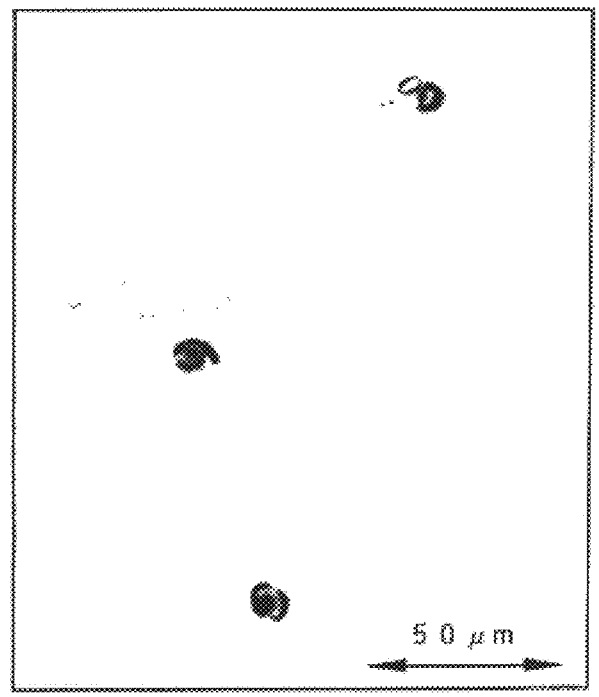
FIG. 23 is a reflection electron image of the glaze surface after an alkali resistance test in Example D1 observed under a scanning electron microscope.

The samples thus obtained were tested for alkali resistance in the same manner as in Example C. The surface of the glaze layer before the alkali resistance test in Example D4 (glaze material frit glaze=20:80) is shown in FIG. 22. The surface free from the emulsifier and substantially free from silica particles was much smoother than the surface of the glaze layer before the alkali resistance test in Comparative Example D6 described below. For the other samples, the higher the proportion of the frit glaze, the lower the amount of silica particles and the smoother the surface. The surface of the glaze layer after the alkali resistance test in Example D4 is shown in FIG. 23. As can be seen from FIG. 23, the surface had no irregularities attributable to dropouts of silica particles, and remained smooth. For the other samples, the higher the proportion of the frit glaze, the smaller the number of cracks created around the silica particles and the better the smoothness.

For the samples, the surface roughness Ra was as shown in the following table.

Further, for the samples, the glossiness of the surface before and after the alkali resistance test was measured with a gloss meter (GM-060, manufactured by Minolta) to determine gloss retention defined by the following equation:

Gloss retention (%)=("glossiness after alkali resistance test"/"glossiness before alkali resistance test")×100

The results are summarized in the following table.

Toilet bowls were prepared in the same manner as described above in connection with the preparation of the samples. The toilet bowls thus obtained were tested for the deposition of urine calculi in the same manner as in Example C. The results were as shown in the following table. In the table, ○ represents that the amount of urine calculi deposited was much smaller than that in Comparative Example D6 described below; X represents that the amount of urine calculi deposited was relatively large although the amount was smaller than that in Comparative Example D6 described below; and - represents that the test was not carried out.

TABLE 3

|  | Mixing proportion, wt % | | Surface roughness Ra, μm | | Gloss retention, % | Deposition of urine calculi |
|---|---|---|---|---|---|---|
|  | Glaze material | Frit glaze | Before alkali resistance test | After alkali resistance test | | |
| Ex. D1 | 50 | 50 | 0.067 | 0.109 | 91.4 | ○ |
| Ex. D2 | 40 | 60 | 0.054 | 0.098 | 92.1 | ○ |
| Ex. D3 | 30 | 70 | 0.057 | 0.082 | 93.9 | — |
| Ex. D4 | 20 | 80 | 0.047 | 0.065 | 95.6 | ○ |
| Ex. D5 | 10 | 90 | 0.038 | 0.054 | 97.5 | — |
| Ex. D6 | 0 | 100 | 0.029 | 0.037 | 100 | ○ |
| Comp. Ex. D1 | 100 | 0 | 0.081 | 0.137 | 81.2 | X |
| Comp. Ex. D2 | 90 | 10 | 0.090 | 0.147 | 81.6 | — |
| Comp. Ex. D3 | 80 | 20 | 0.088 | 0.139 | 82.0 | X |
| Comp. Ex. D4 | 70 | 30 | 0.083 | 0.135 | 82.9 | — |
| Comp. Ex. D5 | 60 | 40 | 0.079 | 0.129 | 85.8 | X |

Comparative Example D6

The material A for a glaze (2 kg), 1 kg of water, and 4 kg of balls were placed in a ceramic pot having a volume of 6 liters, and the mixture was then ball milled for about 18 hr to obtain a glaze. The particle diameter of the color glaze thus obtained was measured with a laser diffraction particle size distribution analyzer. As a result, it was found that 65% of the particles were accounted for by particles having a diameter of not more than 10 μm and the 50% average particle diameter (D50) was 5.8 μm.

Next, the glaze was spray coated onto the plate specimen as used in Example D, followed by firing at 1100 to 1200° C. to obtain a sample.

Figure 20:
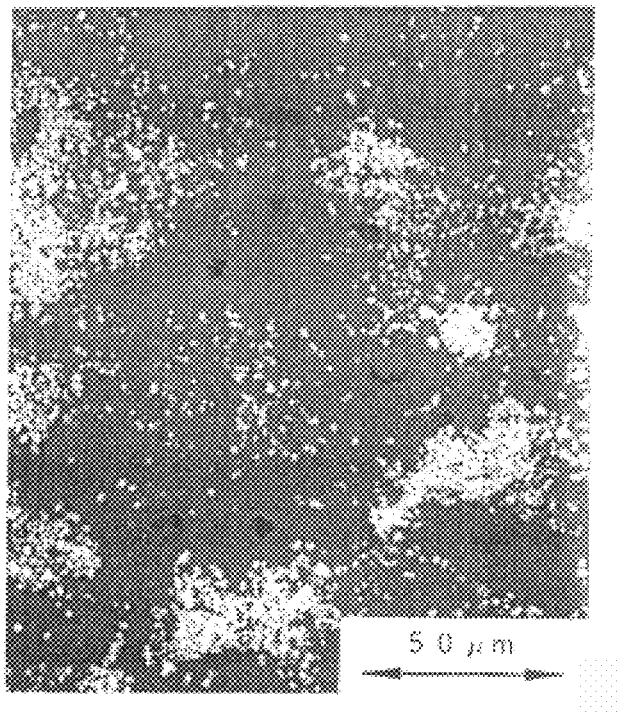
FIG. 20 is a reflection electron image of the glaze surface before an alkali resistance test in Comparative Example D1 observed under a scanning electron microscope.
Figure 21:
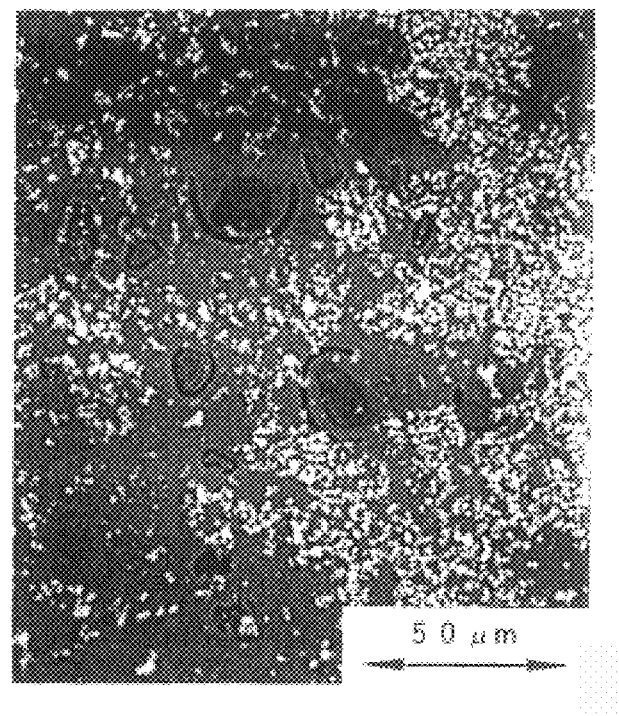
FIG. 21 is a reflection electron image of the glaze surface after an alkali resistance test in Comparative-Example D1 observed under a scanning electron microscope.

The sample thus obtained was tested for alkali resistance. A scanning microphotograph of the glaze surface before the test is shown in FIG. 20. As can be seen from the microphotograph, the emulsifier (white portion) and the silica particles (deeply dark portion) were present and constituted irregularities. A scanning microphotograph of the glaze surface after the test is shown in FIG. 21. A scan be seen from the microphotograph, cracks were created around the silica particles, and there were dropouts of the silica particles, resulting in increased size of irregularities.

For the sample, the surface roughness was Ra=0.10 μm before the alkali resistance test, and Ra=0.25 μm after the alkali resistance test.

The glossiness was measured in the same manner as in Example D. As a result, the glossiness after the test was less than 50% of the glossiness before the test, that is, the gloss retention was 43.2%.

Further, a urine calculi deposition test was carried out in the same manner as in Examples D1 to D6. As a result, a large amount of urine calculi was deposited, and the urine calculi could not be removed by running water.

What is claimed is:

1. A sanitary ware comprising:
   a sanitary ware body; and
   a surface glaze layer formed by applying a particulate glaze material having a 50% particle diameter of not more than 4 μm onto a surface of the sanitary ware body to form a precursor layer and then firing the precursor layer to convert the precursor layer to the surface glaze layer.

2. The sanitary ware of claim 1 wherein the surface glaze layer has a center line average roughness Ra of less than 0.07 μm as measured with a stylus type surface roughness tester according to JIS B 0651-1996.

3. The sanitary ware of claim 2 wherein the Ra is not more than 0.03 μm.

4. The sanitary ware of any one of claims 1 to 3 wherein the surface glaze layer is absent on a part of the surface of the sanitary ware body.

5. The sanitary ware of claim 1 wherein at least one glaze layer is provided between the sanitary ware body and the surface glaze layer.

6. The sanitary ware of claim 5 wherein the surface glaze layer is absent on a part of the surface of the surface of the sanitary we body.

7. The sanitary ware of claim 1 wherein the surface glaze layer has a contact angle with water of less than 30°.

8. The sanitary ware of claim 7 wherein the contact angle is not more than 25°.

9. The sanitary ware of claim 7 wherein the contact angle is not more than 20°.

10. The sanitary ware of claim 1 wherein the sanitary ware is a strainer for urinals, a toilet, a urinal, a flush tank for toilets or urinals, a washbowl in a washstand, or a wash hand basin.

11. The sanitary ware of claim 1 wherein the sanitary ware is a toilet or a urinal, the surface glaze layer being provided at least on the surface of a bowl of the toilet or the urinal, the surface glaze layer being absent on a part of the surface of the toilet or the urinal.

12. The sanitary ware of claim 1 wherein the particulate glaze material is an amorphous glaze material.

13. The sanitary ware of claim 12 wherein the amorphous glaze material is a vitrified frit glaze material.

14. The sanitary ware of claim 1 wherein the glaze material is a mixed glaze comprised of an amorphous glaze material and non-frit glaze material.

15. The sanitary ware of claim 14 wherein the amorphous glaze material is a vitrified frit glaze material.

16. The sanitary ware of claim 14 or 15 wherein the non-frit glaze material has been subjected to size reduction.

17. The sanitary ware of claim 1 wherein at least one color glaze layer is provided between the sanitary ware body and the surface glaze layer, and the surface glaze layer is transparent.

18. The sanitary ware of claim 17 wherein the particulate glaze material has a 50% particle diameter of not more than 1.5 μm.

19. The sanitary ware of claim 17 wherein the particulate glaze material is an amorphous glaze material.

20. The sanitary ware of claim 19 wherein the amorphous glaze material is a vitrified frit glaze material.

21. The sanitary ware of claim 17 wherein the particulate glaze material is a mixed glaze comprised of an amorphous glaze material and a non-frit glaze material.

22. The sanitary ware of claim 21 wherein the amorphous glaze material is a vitrified frit glaze material.

23. The sanitary ware of claim 1 wherein the particulate glaze material has a 50% particle,diameter of not more than 1.5 μm.

24. The sanitary ware of claim 1 wherein the surface glaze layer has a kurtosis Rku of less than 2.70.

25. The sanitary ware of claim 24 wherein the kurtosis Rku is not more than 2.60.

26. The sanitary ware of claim 24 wherein the kurtosis Rku is not more than 2.50.

27. The sanitary ware of claim 1 herein the surface glaze layer consists essentially of a vitreous component and is free from silica particles having a particle diameter of not less than 10 μm after firing the surface glaze layer.

28. The sanitary ware of claim 27 wherein the whole surface glaze layer consists essentially of a vitreous component.

29. The sanitary ware of claim 27 or 28 wherein the surface glaze layer is free from a pigment.

30. The sanitary ware of claim 27 or 28 wherein the surface glaze layer contains a pigment.

31. A sanitary ware of claim 27 wherein the firing is at a temperature of 1300° C. or below.

32. The sanitary ware of claim 31 wherein the temperature is 1100–1300° C.

33. A process for making the sanitary ware of claim 1, the process comprising:

applying a particulate glaze material having a 50% particle diameter of not more than 4 μm onto a sanitary ware body to form a precursor layer; and firing the precursor layer to convert the precursor layer to the surface glaze layer.

* * * * *

UNITED STATES PATENT AND TRADEMARK OFFICE
CERTIFICATE OF CORRECTION

PATENT NO.    : 6,548,162 B1
DATED         : April 15, 2003
INVENTOR(S)   : Machida et al.

It is certified that error appears in the above-identified patent and that said Letters Patent is hereby corrected as shown below:

Column 36,
Lines 43-45, Claim 6, should read: The sanitary ware of claim 5 wherein the surface glaze layer is absent on a part of the surface of the sanitary ware body.
Lines 65-67, Claim 14, should read: The sanitary ware of claim 1 wherein the glaze material is a mixed glaze comprised of an amorphous glaze material and a non-frit glaze material.

Column 38,
Lines 3-6, Claim 27, should read: The sanitary ware of claim 1 wherein the surface glaze layer consists essentially of a vitreous component and is free from silica particles having a particle diameter of not less than 10 $\mu$m after firing the surface glaze layer.

Signed and Sealed this

Twenty-sixth Day of August, 2003

JAMES E. ROGAN
*Director of the United States Patent and Trademark Office*